INVENTORS
ROBERT K. KAYE
JOSEPH P. WESTON
BY Francis E. Blake
ATTORNEY

July 29, 1958 R. K. KAYE ET AL 2,845,492

KEY TELEPHONE SYSTEM

Filed March 14, 1957 15 Sheets-Sheet 2

July 29, 1958 R. K. KAYE ET AL 2,845,492

KEY TELEPHONE SYSTEM

Filed March 14, 1957 15 Sheets-Sheet 5

July 29, 1958 R. K. KAYE ET AL 2,845,492

KEY TELEPHONE SYSTEM

Filed March 14, 1957 15 Sheets-Sheet 6

July 29, 1958 R. K. KAYE ET AL 2,845,492

KEY TELEPHONE SYSTEM

Filed March 14, 1957 15 Sheets-Sheet 7

CONTROL CCTS. FOR AUTOMATIC EXCLUSION
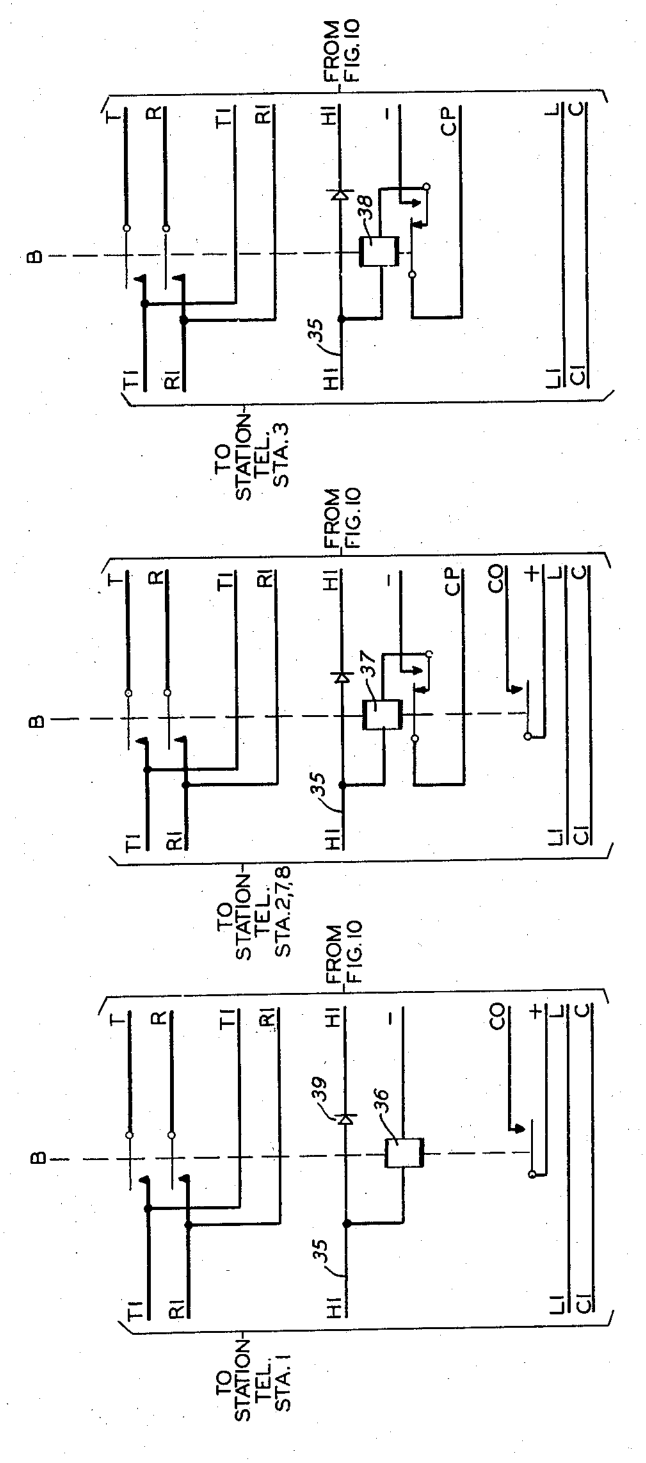
FIG. 13 PRIORITY C, FIG. 12 PRIORITY B, FIG. 11 PRIORITY A July 29, 1958 R. K. KAYE ET AL 2,845,492

KEY TELEPHONE SYSTEM

Filed March 14, 1957 15 Sheets-Sheet 11

July 29, 1958 R. K. KAYE ET AL 2,845,492

KEY TELEPHONE SYSTEM

Filed March 14, 1957 15 Sheets-Sheet 12

July 29, 1958 R. K. KAYE ET AL 2,845,492

KEY TELEPHONE SYSTEM

Filed March 14, 1957 15 Sheets-Sheet 15

AUTOMATIC TIE-LINE CIRCUIT

United States Patent Office 2,845,492
Patented July 29, 1958

1 2

2,845,492

KEY TELEPHONE SYSTEM

Robert K. Kaye and Joseph P. Weston, Rochester, N. Y., assignors to General Dynamics Corporation, Rochester, N. Y., a corporation of Delaware Application March 14, 1957, Serial No. 645,991

17 Claims. (Cl. 179—1)

This invention relates to telephone systems in which the subscriber's instruments are provided with key switching means by which a subscriber may establish connections over a plurality of lines.

The object of the invention is to improve conventional systems of this nature by employing more economical means and by effecting equal or greater service with less apparatus.

The conventional key telephone system is a subscriber operated system in which each subscriber of a plurality is provided with a telephone instrument having a plurality of buttons or keys built into the base of the cradle and by which he may switch his telephone to and from a plurality of lines, such as central office, P. B. X, intercommunicating or tie lines.

The incoming signals are translated to either audible or visible manifestations, either steady or intermittent in operation. When an incoming call is answered, the audible type signal is silenced and a flashing visible signal is changed to a steady busy indication. A means is provided for releasing operated means responsive to such an incoming call if such call is not answered within a given time limit.

Holding means is provided so that an incoming call may be held while an answering subscriber goes to another line for any one of a number of reasons, such as to seek information, or to notify another subscriber that he is wanted on such and such a line. The holding button, when depressed, mechanically releases the key used in the first established connection and the holding circuit, established, is released when the same or another subscriber comes in on the line being held. When a visual signal is being used then the steady line busy indication is changed to a wink signal, that is, an occasional but regular flicker in such steady indication as a signal that the line is being held.

Various means are provided to disconnect extension circuits of various kinds. When a manually operated button which must be manually restored is employed, this is known as a cutoff feature, whereas when the button is operated only after the telephone has been lifted from its cradle and is automatically restored when the telephone is replaced on its cradle, this is known as an exclusion feature.

Cutoff and exclusion means are also conventionally placed on an automatic basis. In the automatic exclusion circuits, a main station may be arranged to cut off automatically one or more secondary stations, regardless of whether or not the stations are in use. In the automatic cutoff circuits, a number of optional arrangements are provided to cut off stations from the line as follows:

(*a*) Station can cut off others and cannot be cut off.

(*b*) Station can cut off others and can be cut off except during a call.

(*c*) Station or group of stations cannot cut off others and can be cut off except during a call.

(*d*) Station cannot cut off others and can be cut off at any time.

Intercommunication between the various stations of the system may be provided under a variety of conditions so that any one subscriber may communicate with other persons at one or more stations over a common talking channel. The intercommunicating line may be provided with a line and busy lamp and either built in or external signaling buttons. An intercommunicating line arranged to signal automatically from one end to the other by removing the telephone from its cradle and to signal manually in the other direction is known as a one-way automatic intercommunicating line. When the same signaling in both directions is automatic it is known as a 2-way automatic intercommunicating line.

Dial service intercommunication is provided whereby various other stations may be selectively called in to the intercommunication channel by the transmission of dial pulses and this may be arranged as either a small system requiring one pull of the dial or a larger system requiring two pulls of the dial.

The key telephone system differs fundamentally from a P. B. X system where a plurality of subscribers are served by a switchboard under control of an operator. In the key telephone system a limited number of subscriber's stations are provided and each may have access to all the incoming lines. In the installation the incoming line terminals and a number of apparatus units including the few relays and other switching devices are placed at some convenient and inconspicuous place and a cable is then multipled to each subscriber location. One of these may be used as a principal station and the subscriber thereat may be assigned the duty of answering the incoming calls, but it will be understood that any one of the subscribers may do this.

One of the features of the present system is the arrangement of a dial selective intercommunication system, commonly spoken of as the intercom. In accordance with this arrangement, all the stations having intercom service may use a channel in common and may be individually selected and called or each station may be provided with an exclusion circuit whereby secrecy between the calling and called station may be maintained, or the service may be mixed, certain stations having free access to the common channel at any and all times and others being provided with exclusion circuits so that all others except the free access and the particular called station may be excluded. In accordance with this feature each exclusion circuit includes a connector relay for connecting that particular station to the intercom channel and a cutoff relay. When the station makes a call its connector relay is operated and after locking into a holding circuit independent of its cutoff relay, then operates all the cutoff relays in the intercom arrangement, thus preventing the operation of any other connector relay with the exception of that one belonging to the dialed called station which is specifically operated from the dial switch in a common control circuit. In accordance with the present feature the conventional common cutoff relays are eliminated so it is possible to add new stations at any time without making any changes or additions in the common circuit. By this arrangement the number of individual conductors between the exclusion circuit and the common circuit may be reduced to one since the conventional battery feed cutoff conductor may be eliminated.

A feature of the invention is a plurality of relays having their windings connected in parallel so that as a whole they constitute a single relay but being physically located apart may control separately located apparatus units. Since this virtual common cutoff relay may thus be increased or decreased in capacity at will, no planning for the future with the installation of a larger than necessary cutoff relay or the substitution of a greater capacity relay for an inadequate one is necessary.

Another feature of the invention is the use of an exclusion circuit for each station on an intercom circuit having a connector and a cutoff relay in a circuit arrangement in which the order of the operation of said two relays determines the control which one has over the other. In that exclusion circuit where a subscriber makes a call the connector relay is operated first and as a result thereof the cutoff relay is operated and held operated under the calling subscriber's control, but in another exclusion circuit where the cutoff relay is operated first there may be no operation of the connector relay. However, if the said connector relay does become operated then it is locked into operation even though the subscriber retires. The release of all exclusion circuits is a function of the last party to release, so it may appear that whereas one party may build up the connection, such connection will be maintained under control of another.

Another feature of the invention is a means in an exclusion circuit for immediately connecting a wanted intercom subscriber's station to the intercom circuit upon selection thereof without making this operation dependent on the answer of such subscriber. Thus the conventional maintenance of an operating circuit from the common circuit to the exclusion circuit until the called subscriber answers is not necessary so that the called subscriber may be redialed or other subscribers may be dialed for conference purposes. In other words the calling subscriber is not put to the necessity of waiting for the called subscriber to answer.

A feature of the present invention is a common selective signaling circuit means which may be operated to signal a wanted station repeatedly or alternatively to signal a plurality of different stations. Heretofore it has been conventional to use such a minor switch circuit to select a particular wanted station and to set up from such switch circuit the conditions allowing an answering called station to switch his telephone on to the intercom line, but this had to be done while the switch was set and therefore the switch had to be maintained in this set position. In accordance with the present invention it is only necessary to reach the called line momentarily for as the line is reached its connector relay will operate and lock the wanted party in to the intercom circuit and the switch will be held in its set position only long enough to transmit a short duration calling signal. The switch is then completely released.

Thereafter other wanted intercom subscribers may be called for conference purposes or if the one called does not answer promptly he may be recalled.

Thus a feature of the invention is the provision of a step by step switch which may be pulsed to any given destination, which will remain in its set position only long enough to transmit a calling signal and will then drop back to normal. Such a switch may be operated once to select any given line within its capacity or it may be operated a plurality of times, making a different set of wipers effective on each such operation. Where the switch is to be used to select from a group larger than the capacity of the switch, then its first movement is to a particular set of terminals which operate to render a second movement effective. If in its first movement the switch selects a given one digit outgoing terminal, a second movement thereof will operate to select another given one digit terminal whereas if the first movement is to this said particular set of terminals then its second movement will cause the selection of a two digit terminal.

A feature of the invention may then be characterized as the combination of a subscriber controlled step by step switch for selecting and triggering a called circuit, signaling such called circuit and then releasing to a condition where it may be set again either to such selected and signaled circuit to signal said circuit again or to select, trigger and signal another circuit, with a plurality of called station circuits each having a locking means therein responsive to such a selecting and triggering operation.

A feature of the invention is a two way signaling circuit used in and made a part of an automatic tie line circuit for linking two key telephone systems. In this signaling system a line is provided with a calling bridge relay for local battery feed and signaling purposes at each end thereof and being isolated for direct current transmission into the tie line portion of the circuit extending from system to system. This tie line portion is then provided with a battery feed relay at each end thereof, the polarity of the connections of such relay to the tie line being controlled by the associated calling bridge relay. The said tie line battery feed relays, however, do not respond to any subscriber bridge but only to a single reversal of the line between each other. On a calling condition when only one bridge is established and one reversal of the tie line is made both tie line battery feed relays will operate and when the answering bridge at the distant end is established and a second reversal of the tie line is made, both these battery feed relays will release.

In accordance with this feature, then, each local tie line termination is provided with a relay in a two conductor loop circuit to the corresponding relay in the other termination, both said relays being unresponsive to a normal connection therebetween involving an even number of reversals of the said loop circuit and both being simultaneously responsive to an odd number of reversals of the said loop therebetween.

Another feature of the invention is a station line circuit provided with an automatic station ringing feature. A station line circuit arrangement whereby a distant station on a conventional two wire line may be reached from a key telephone station has heretofore been conventionally provided with a manual signaling means whereby a key telephone subscriber must of necessity operate a ringing key. In accordance with the present feature a key telephone subscriber merely makes connection to such a station line circuit and means are provided to automatically call such distant subscriber. If no answer is obtained, the distant subscriber may be called again and again by simple switchhook operation.

The drawings consist of fifteen sheets, having twenty-eight figures, as follows.

Figure 1:
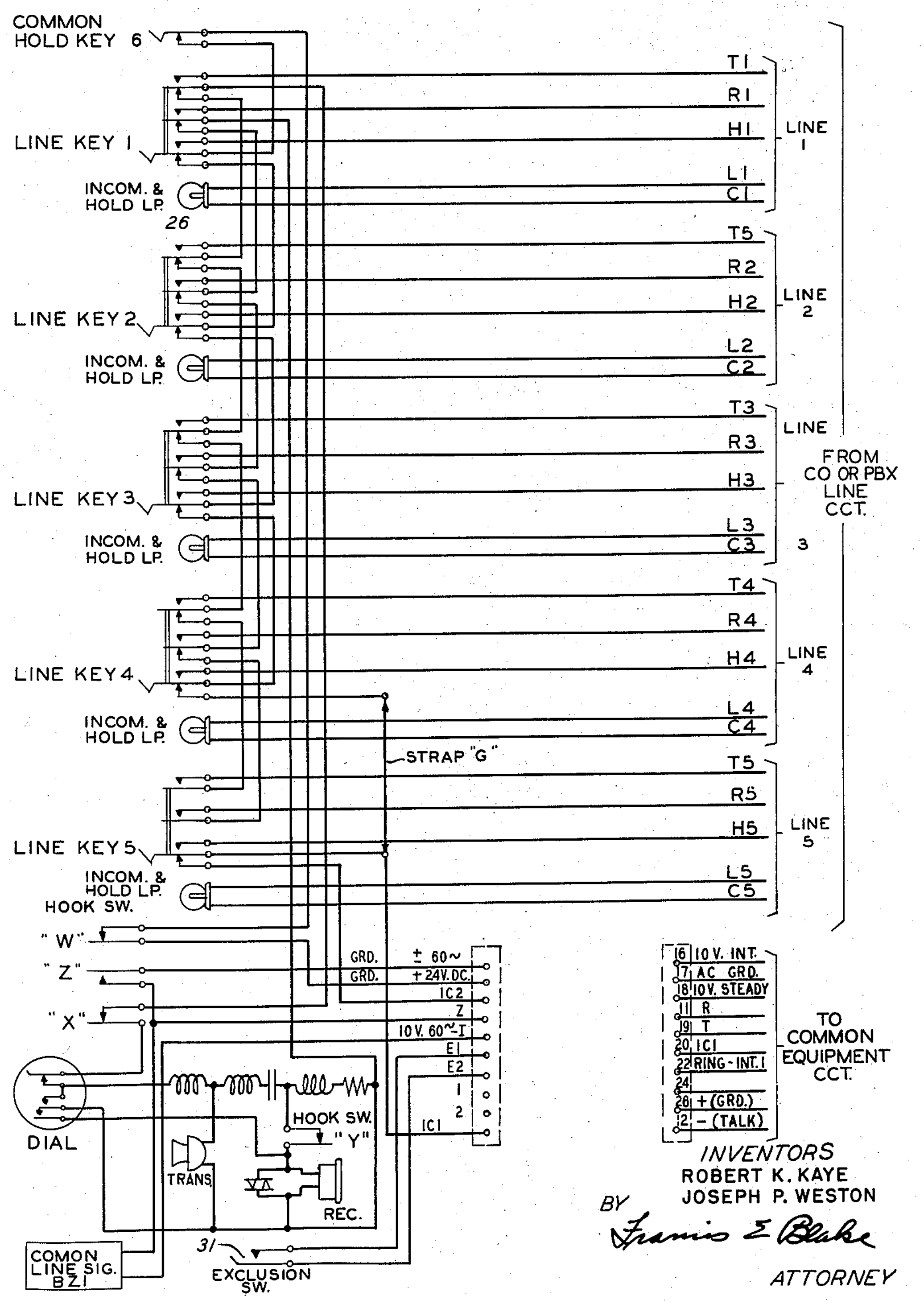
Fig. 1 is a schematic circuit diagram of a station circuit showing the telephone in the condition obtained with the handset off the cradle and the hook switch contacts operated.
Figure 5:
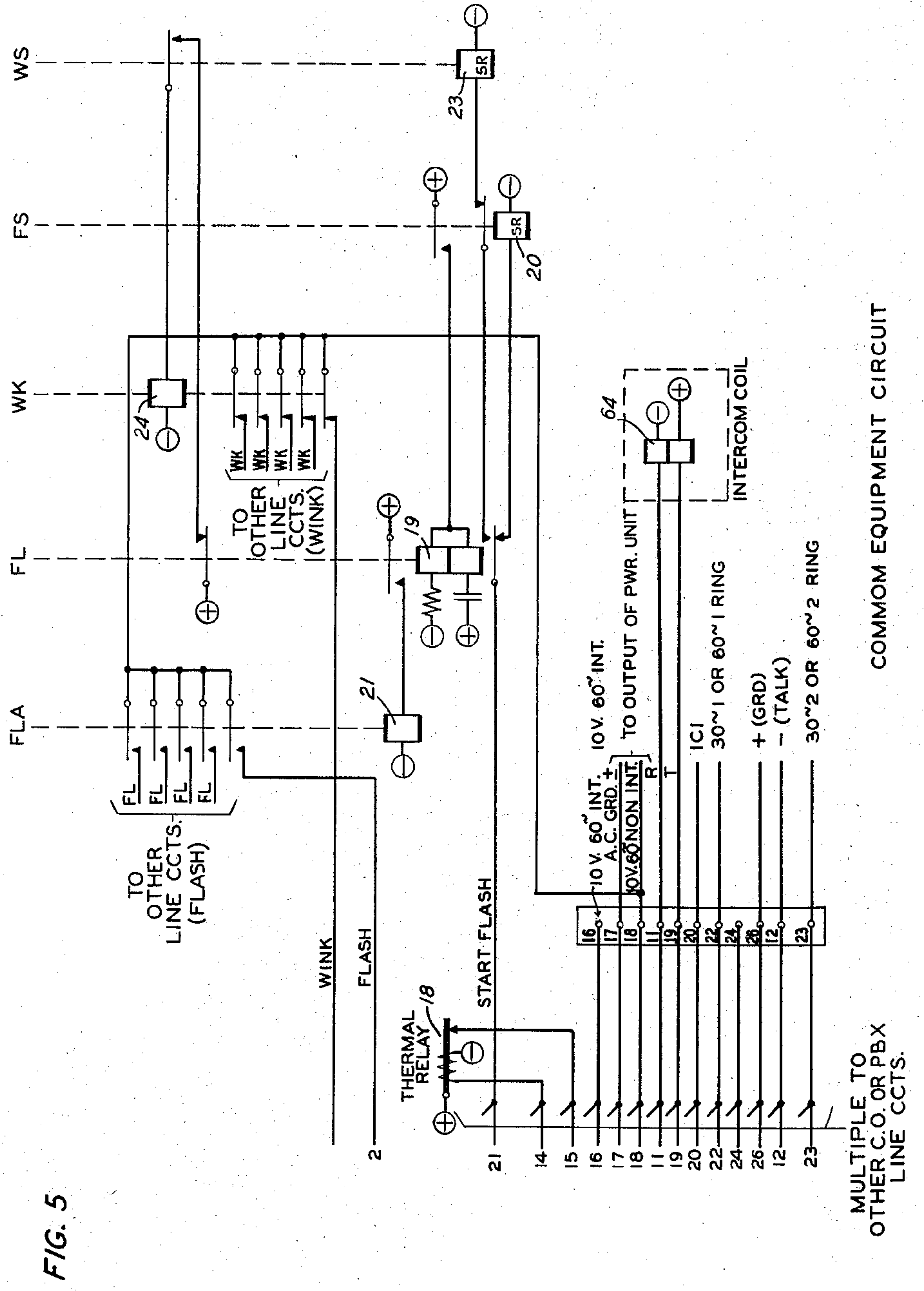
Fig. 5 is a schematic circuit diagram showing apparatus and circuits common to all incoming lines and showing the connections to a plurality of wires multipled to all stations carrying different signal circuit supplies.
Figure 6:
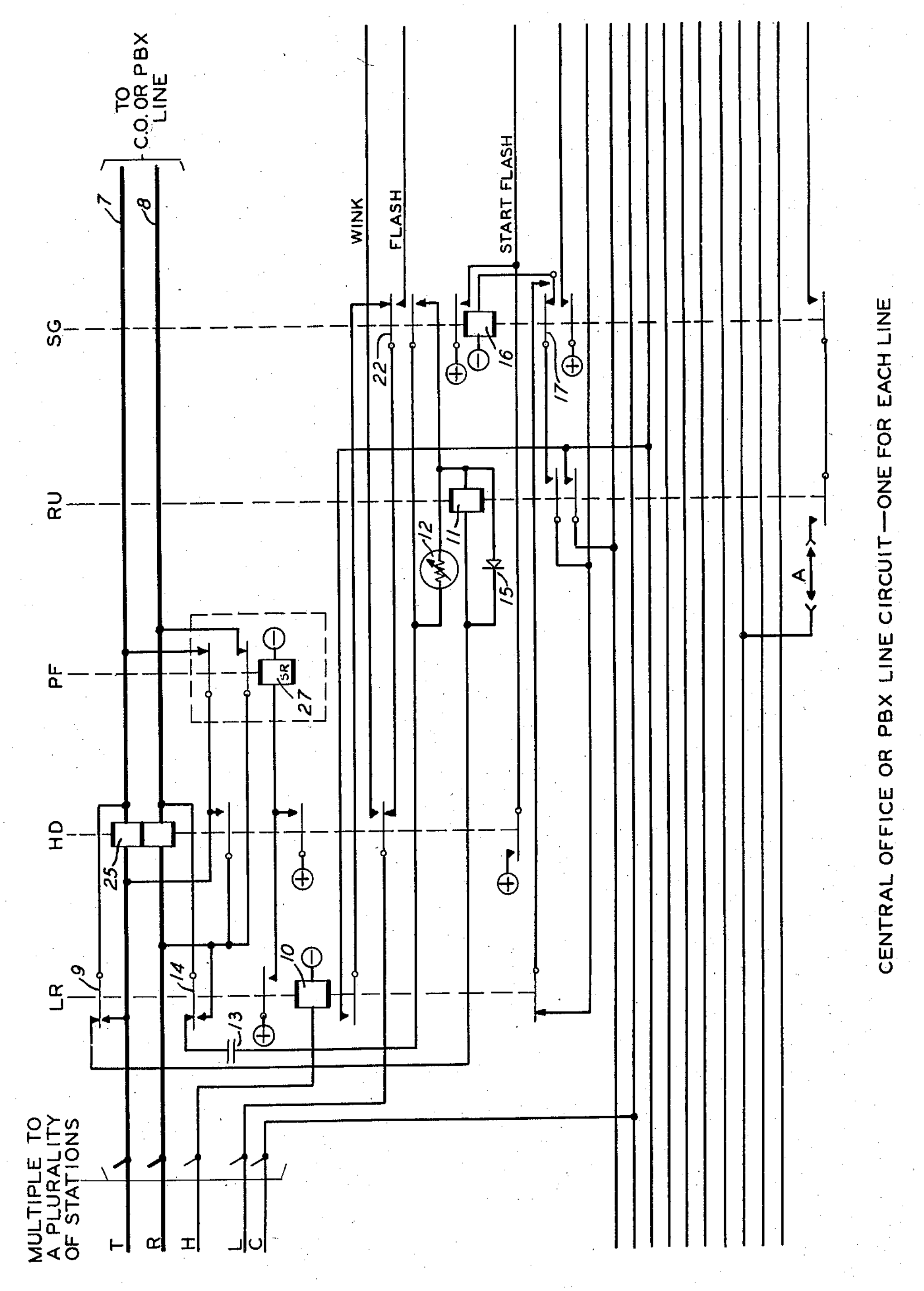
Figure 23:
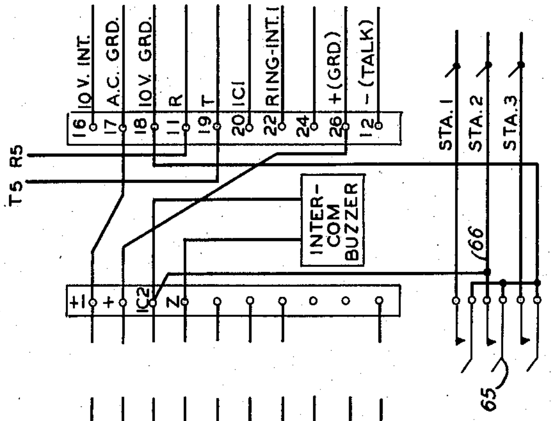
Figure 22:
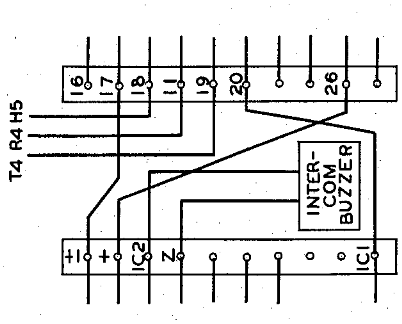
Figure 21:
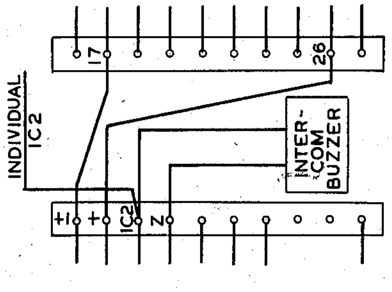
Figure 8:
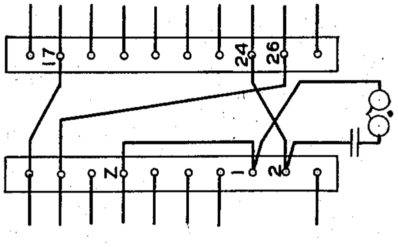
Figure 7:
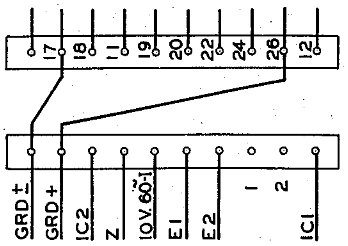
Figure 28:
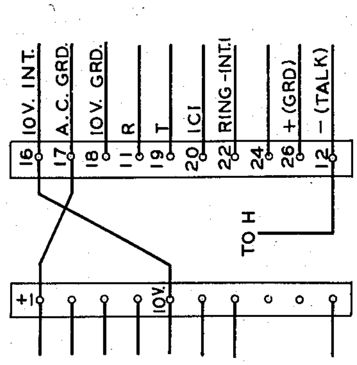
Figure 27:
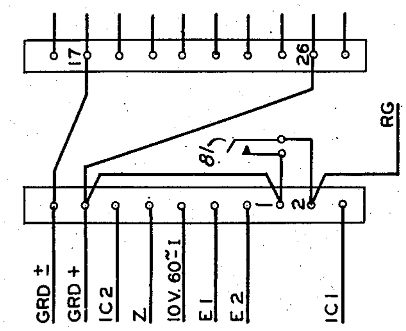
Figures 9, 25:
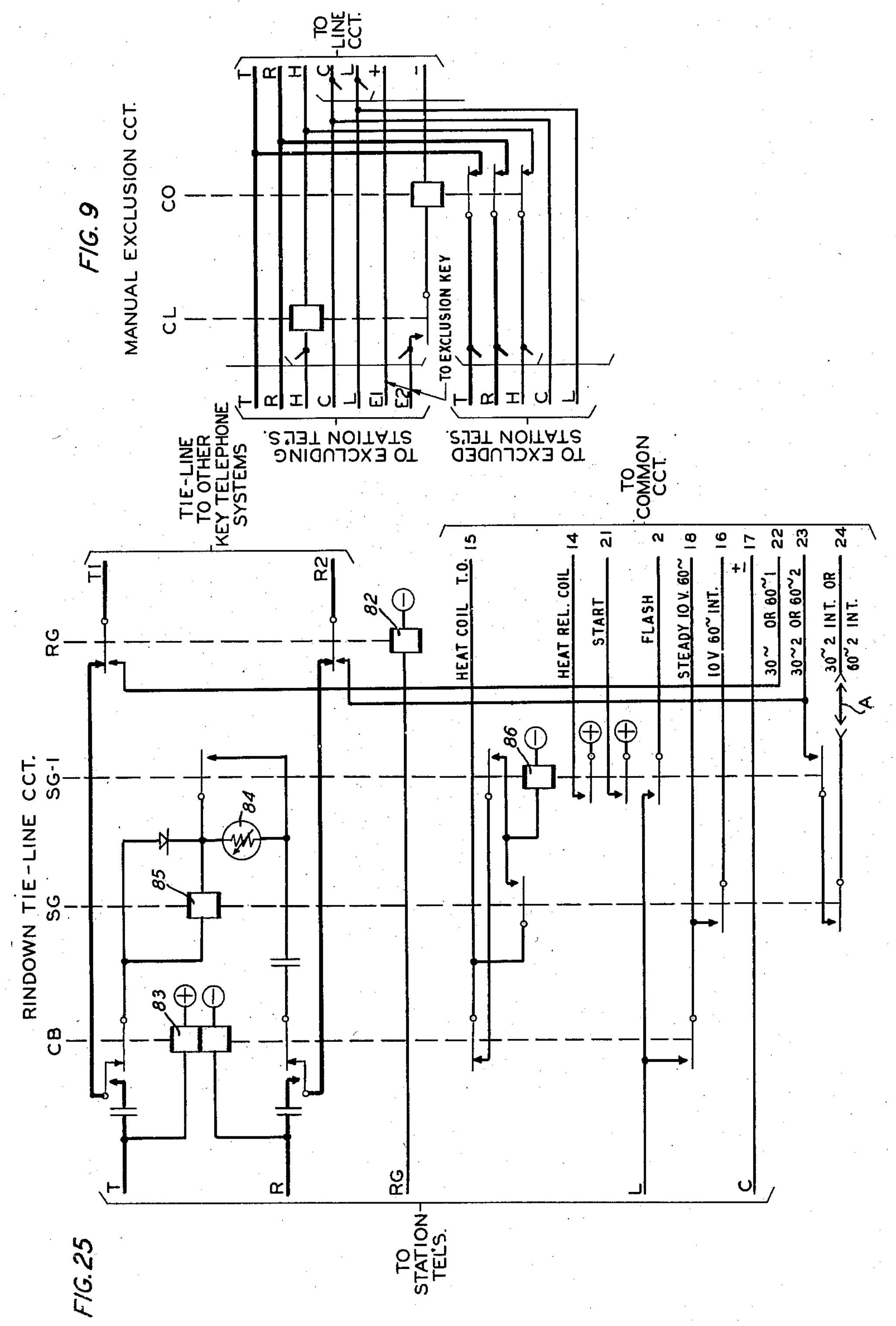
Figures 10, 19, 20:
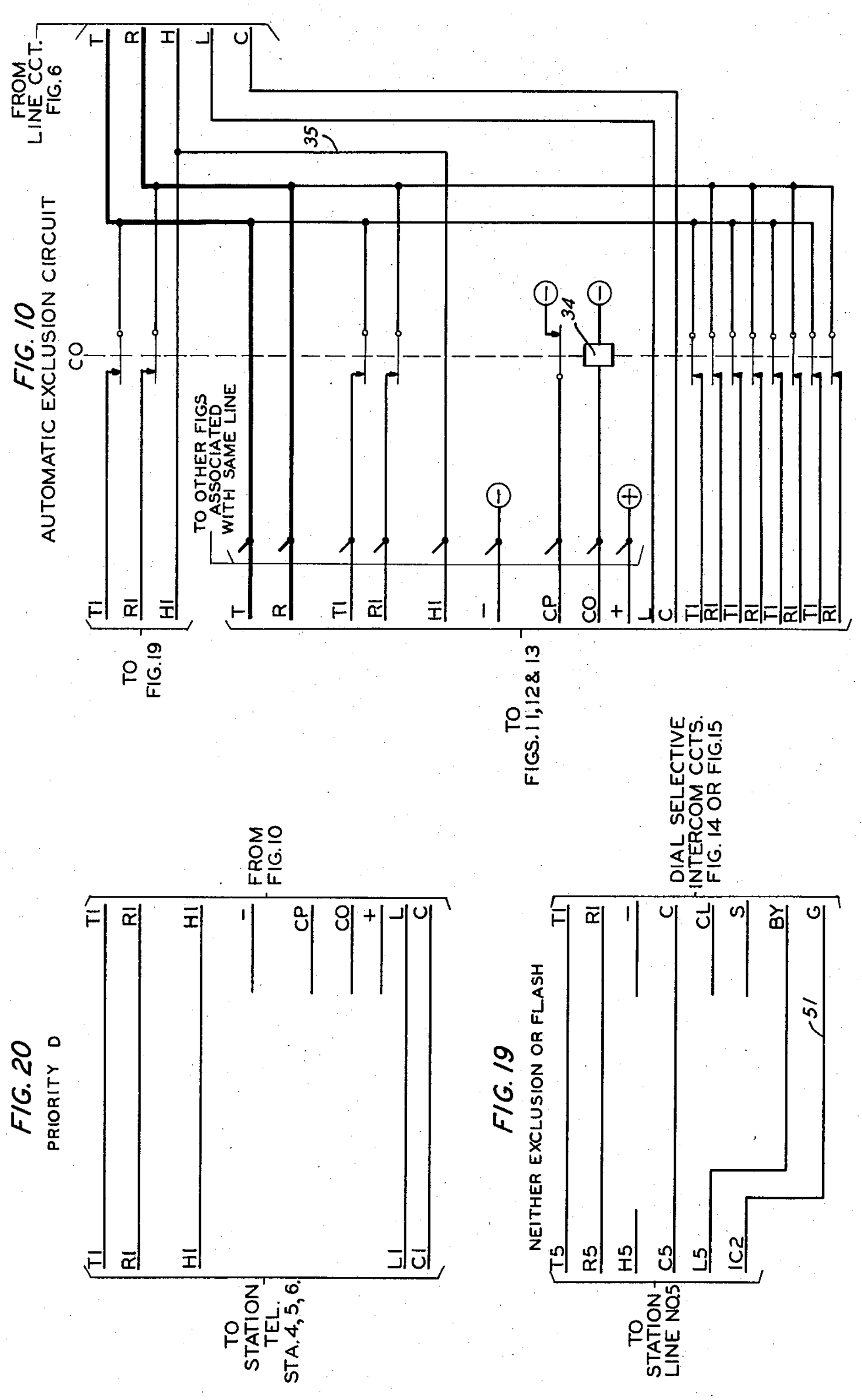
Figure 14:
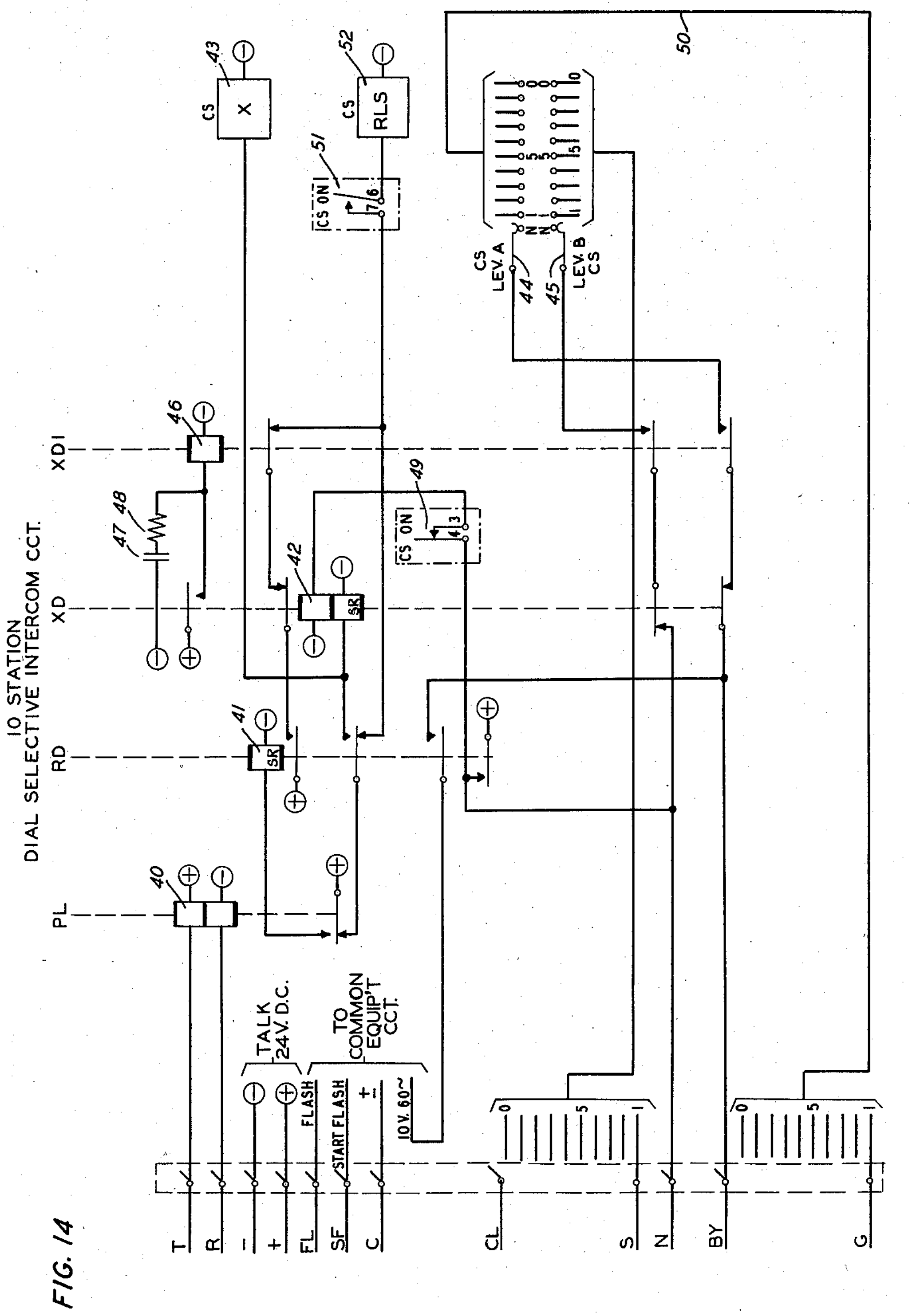
Figure 15:
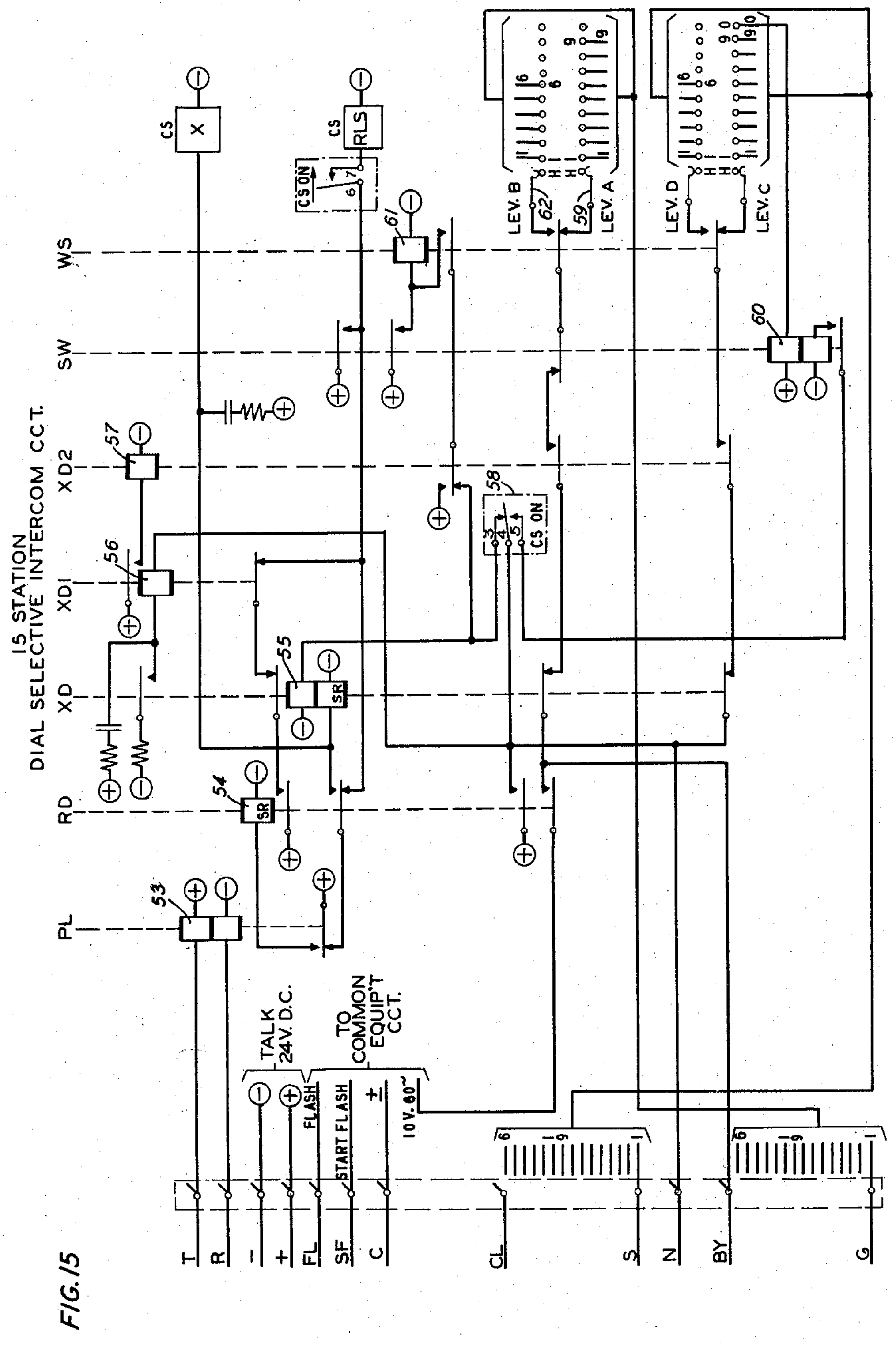
Figure 16:
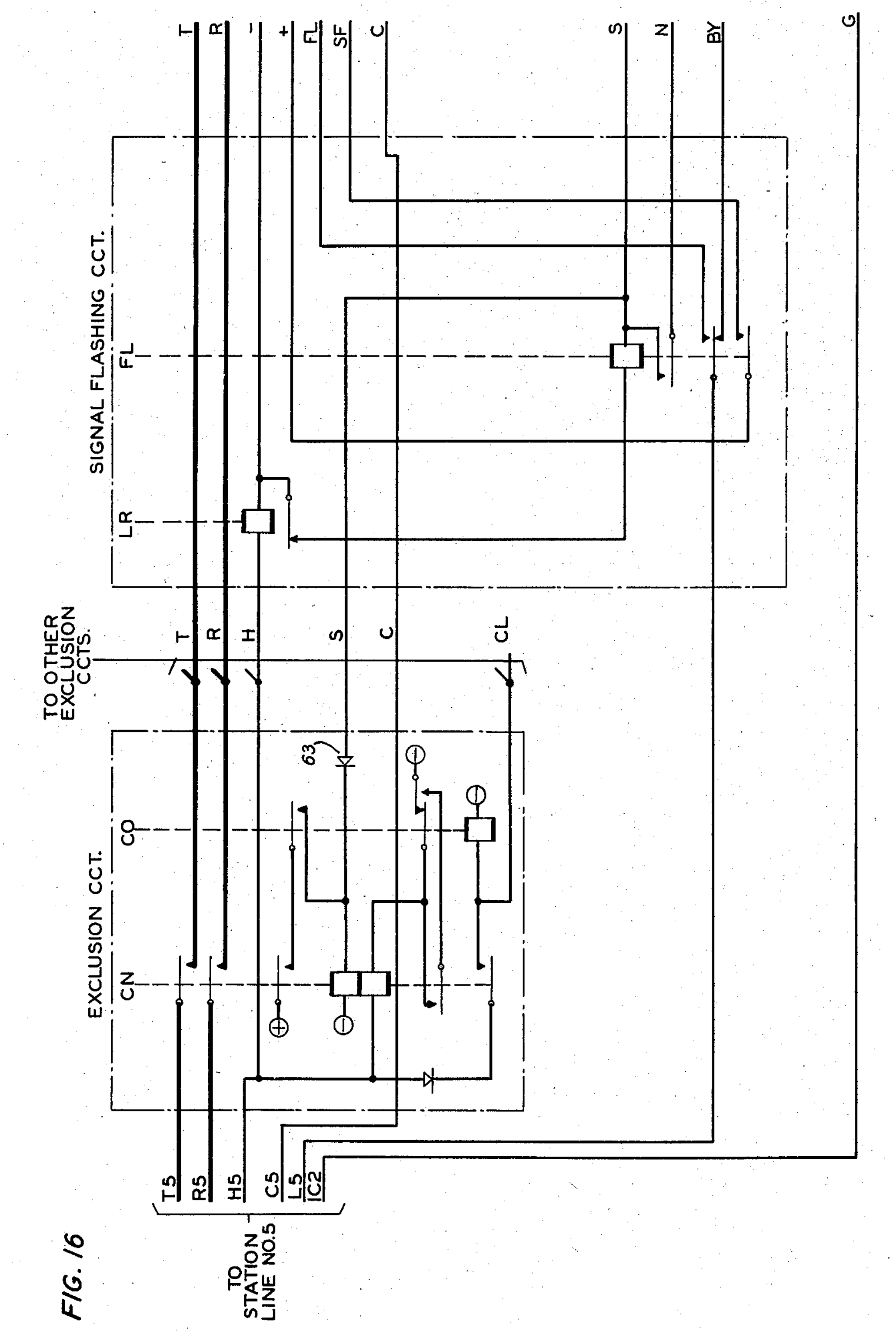
Figures 17, 18:
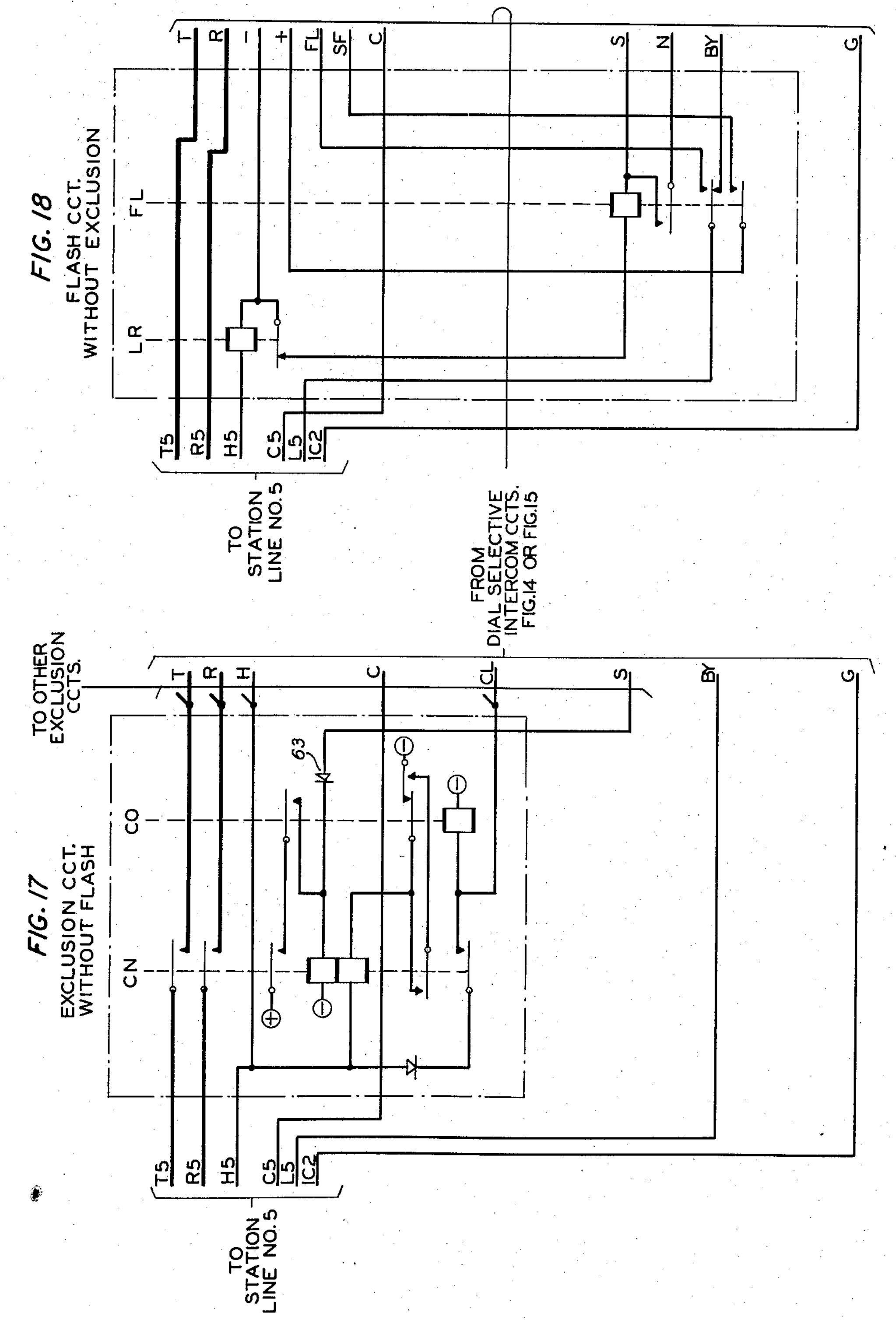
Figure 24:
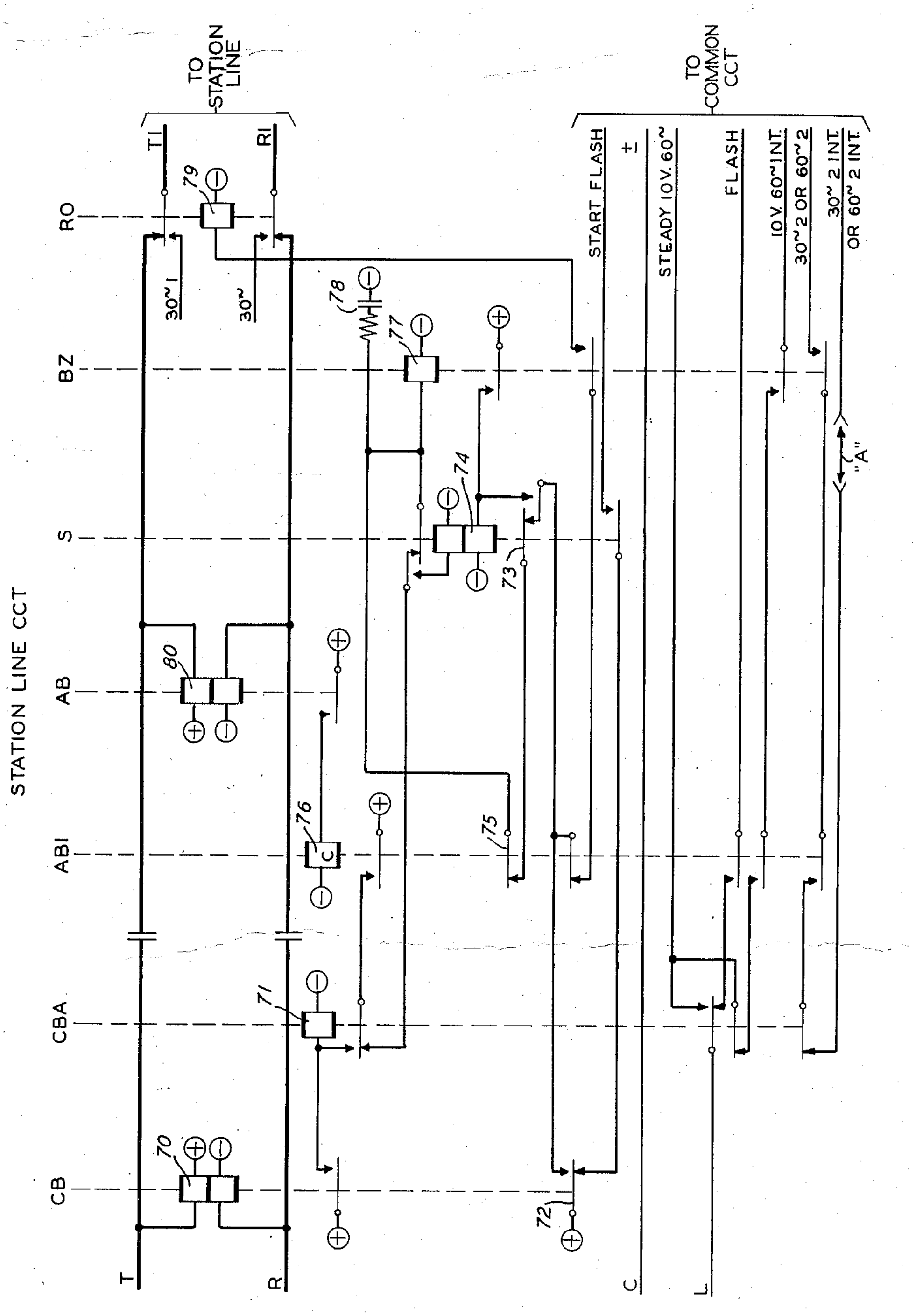
Figure 26:
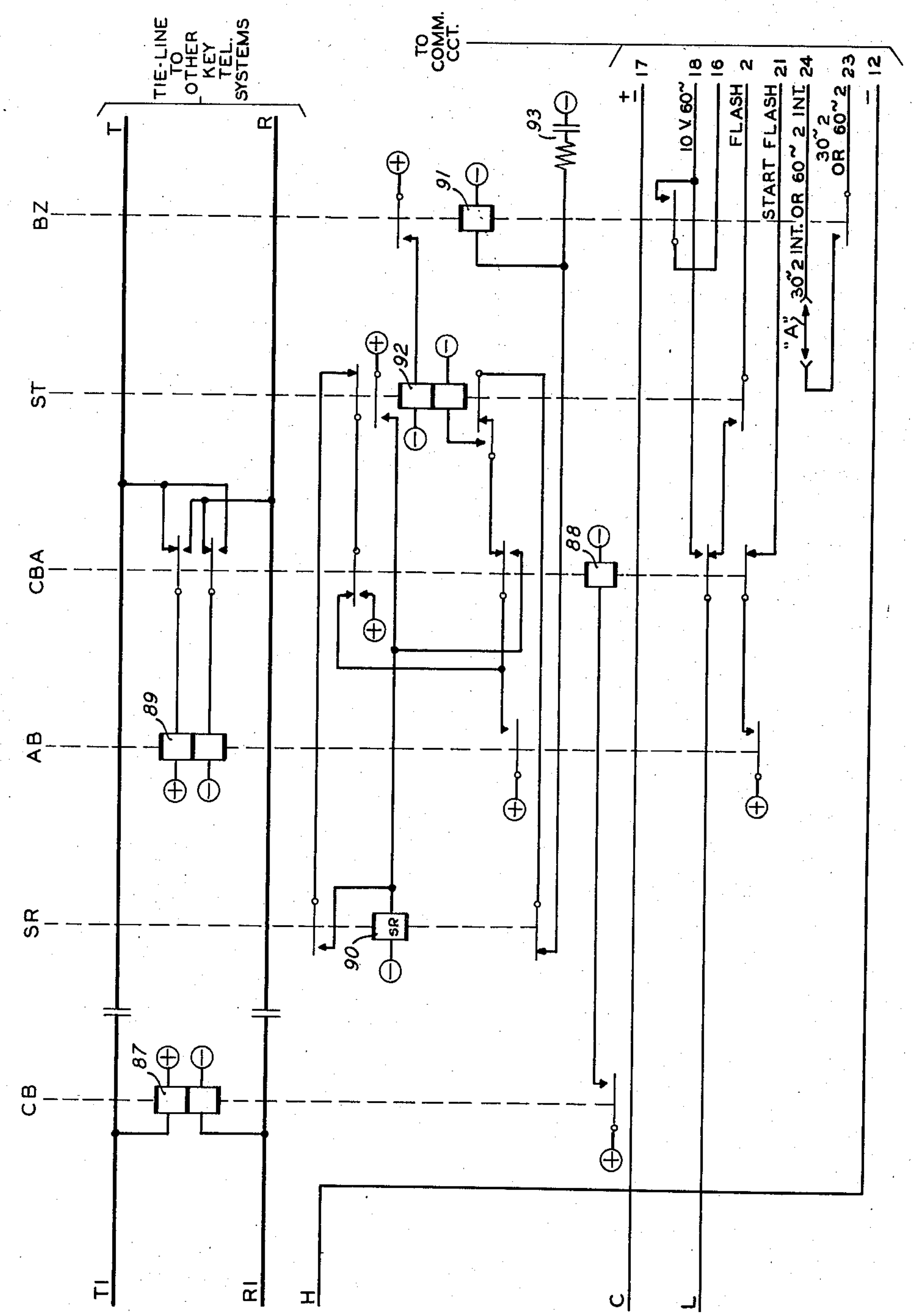

Fig. 6 is a schematic circuit diagram showing circuits and apparatus individual to each central office or P. B. X line but common to all stations of the present system;

Fig. 7 is a fragmentary schematic circuit diagram showing the cross connections between the multiple of connections from the common signaling circuit Fig 5. and the telephone set at the substation Fig. 1 where no special service is to be provided;

Fig. 8 is a fragmentary schematic circuit diagram showing the cross connections between the multiple of connections from the common signaling circuit Fig. 5 and the substation Fig. 1 where an extension bell is provided;

Fig. 9 is a schematic circuit diagram of a manual exclusion circuit by which any one of the subscribers on channel 1 (stations 1, 5 and 8 in Fig. 2) may cut off other subscribers (stations 2, 3, 4, 6, 7 and 9 in Fig. 2) from the use of the central office line 30 (Fig. 3) while any one of such controlling substations are in use;

Fig. 10 is a schematic circuit diagram of the principal part of an automatic exclusion circuit having four degrees of exclusion and which alone provides the degree D of exclusion in which the subscriber may not cause any other subscriber to be cut off and may be cut off at any time;

Fig. 11 is a schematic circuit diagram of a circuit which in cooperation with the circuit of Fig. 10 provides the degree A of exclusion in which the subscriber can cut off others and cannot himself be cut off;

Fig. 12 is a schematic circuit diagram of a circuit which in cooperation with the circuit of Fig. 10 provides the degree B of exclusion in which the subscriber can cut off others and can himself be cut off excepting while using the line;

Fig. 13 is a schematic circuit diagram of a circuit which in cooperation with the circuit of Fig. 10 provides the degree C of exclusion in which the subscriber cannot cut off others and can himself be cut off excepting while using the line;

Fig. 14 is a schematic circuit diagram of a common circuit used for intercom signaling in a system provided with up to ten stations;

Fig. 15 is a similar schematic circuit diagram of a common circuit used for intercom signaling in a two digit selective calling system;

Fig. 16 is a schematic circuit diagram showing a flashing circuit and an exclusion circuit placed between a common circuit such as Fig. 14 or Fig. 15 and a particular station arranged for intercom service;

Fig. 17 is a schematic circuit diagram, similar to Fig. 16 showing only the exclusion circuit;

Fig. 18 is a schematic circuit diagram similar to Fig. 16 showing only the flashing circuit;

Fig. 19 is a schematic circuit diagram similar to Fig. 16 showing the connections used when neither flashing nor exclusion is employed;

Fig. 20 is a schematic circuit diagram used as an extension of Fig. 10, showing particularly which outgoing conductors of Fig. 10 are extended to stations 4, 5 and 6 to provide priority D service;

Fig. 21 is a fragmentary schematic circuit diagram showing certain cross connections made at a substation arranged for intercom service;

Fig. 22 is a fragmentary schematic circuit diagram showing certain cross connections made at a substation arranged for common code signaling intercom service;

Fig. 23 is a fragmentary schematic circuit diagram showing certain cross connections and a set of extra buttons at each substation individual to each other station arranged for key selective intercom service;

Fig. 24 is a schematic circuit diagram of a station line circuit by which a distant conventional telephone substation on a two wire circuit may call into or be called from stations in the key telephone system;

Fig. 25 is a schematic circuit diagram of a ring-down tie line circuit used as a link between two key telephone systems in which the calling subscriber after making connection to such a tie line must operate a ringing key to signal the distant system;

Fig. 26 is a schematic circuit diagram of an automatic tie line circuit used as a link between two key telephone systems in which the signaling of the distant system is automatically carried out upon the seizure of the tie line;

Fig. 27 is a fragmentary circuit diagram showing the cross connections made between the common conductors at a station equipped to operate over a ringdown tie line, and showing the connections to a ringing key which may be mounted in the telephone station set if provided or mounted externally thereto; and Fig. 28 is a fragmentary circuit diagram showing the cross connections made between the common conductors at a station arranged to operate over an automatic tie line and particularly where the station so arranged is also provided with a manual exclusion feature.

The telephone instrument for serving the subscriber is supplied in several forms but may be exemplified by the showing of Fig. 1. The outstanding feature of this device consists of a row of pushbuttons and signal lamps in the base of the instrument, by which the subscriber may establish connection to a plurality of different lines. In general, there are five buttons which operate in an interlocking arrangement, that is, when one is operated it releases another previously operated. These five buttons each control the connection of the telephone station circuit to one of five lines. By way of example, if the subscriber answers a call by operating his line key 1 and finds out that the call is for another subscriber to this system, he may push the common hold key 6, which will establish a holding circuit for the line connected to the line key 1 and then mechanically release the line key. The subscriber may then make a call, over his intercom circuit to notify the wanted party that there is a call awaiting him on this line 1. The wanted party will then pick up the call on his own instrument and in doing so will release the holding circuit which had been established by the party who first answered the call.

A large variety of different operations may be carried out with subscriber's sets of this nature as will appear as each different circuit is described. The above described operation, involving the handling of a central office or P. B. X call, may be examined in detail with the help of Fig. 1 and Figs. 5 and 6, Fig. 1 showing apparatus and circuits common to all stations and lines, and Figs. 5 and 6 showing circuits common to all stations but individual to a given central office line.

*Incoming call*

Let it be assumed that at the distant end, say at a central office, the line having the tip and ring conductors 7 and 8 respectively has been seized and that ringing current is being transmitted thereover. A circuit for this will be found from the tip 7, over the armature 9 and back contact of the LR relay 10, the winding of the ring up RU relay 11, the thermistor 12, the condenser 13, the back contact and armature 14 of the LR relay 10 to the ring 8 of the line. It may be noted that the thermistor 12 and the varistor 15 connected about the winding of the relay 11 are provided to prevent the operation of this relay by random spikes or switching transients because when this relay 11 operates only momentarily it causes the operation of the signal relay 16 and since this locks, a momentary erroneous and random operation of the ring up relay must be prevented.

When the incoming ringing current has flowed through the thermistor long enough to cause a significant lowering of the ringing current path through the relay 11 and to thereby establish its identity as a genuine signal, the relay 11 operates and causes the operation of the SG signal relay 16 in a path from battery, the winding of relay 16, back contact and armature 17 thereof, a front contact and armature of the ring up relay 11, the multipled conductor 15 (multipled to other line circuits), the normal contact of the thermal relay 18 to ground. This causes the operation of relay 16, which then locks through the front contacts of armature 17 thereof, an armature and back contact of the LR relay 10 to the multipled conductor 15, thus rendering the continued energization of the SG relay 16 dependent on the line relay 10. The signal relay 16 controls the signaling of the incoming call.

The operation of relay 16 places a ground on the start flash conductor leading in to Fig. 5 where it is extended through the armature and back contact of the FL relay 19 and the winding of the slow release FS relay 20 to battery. Relay 20 operates and in turn causes the operation of the FL relay 19 which thereupon cuts off relay 20. When relay 20 releases, relay 19 is released and since these two relays are in a mutual control circuit they will continue to alternately operate and release, the timing being a function of the slow releasing characteristics of the relay 20.

During each operation of relay 19 the FLA relay 21 will be operated to close the power lead 18 carrying a supply of 10 volts 60 cycle non interrupted current to the armatures of the relay 21 leading to several individual flash conductors such as the conductor connected to the front contact of armature 22 of the relay 16. Thus a flashing signal is supplied.

It may be noted at this time that after the FL relay 19 is operated and upon the release of relay 20, the relay 23 will be operated. Since the FL relay 19 has no slow releasing properties it will release almost instantly after relay 20 releases and therefore the circuit for relay 23 is closed for an extremely short interval and its operation is substantially controlled by its own slow releasing properties. Thus the WK relay 24 operates at the same rate as the FL relay 19, but produces only a very fleeting interruption of the supply of signaling current to the individual wink conductors. The flash and wink signals will continue as long as the start flash conductor is grounded by relay 16 in this or any other individual line circuit.

Before leaving the common equipment circuit, Fig. 5, it may be noted that the individual ring up relay will operate periodically until the call is abandoned by the distant calling party. Thereafter the SG relay will remain locked under control of the thermal relay 18. A circuit for this relay is closed by the signal relay 16 so that if the call is not answered within a certain period, then the thermal relay will operate and release the signal relay 16. If the periodic operation of the ring up relay 11 has ceased, the line circuit will be returned to its normal condition.

Thus, on the start of an incoming call and upon the operation of the SG relay 16, the flash circuit will be connected through the front contact and armature 22 of relay 16, the back contact and an armature of the HD relay 25, to the L conductor multipled before all the substations.

Figure 2:
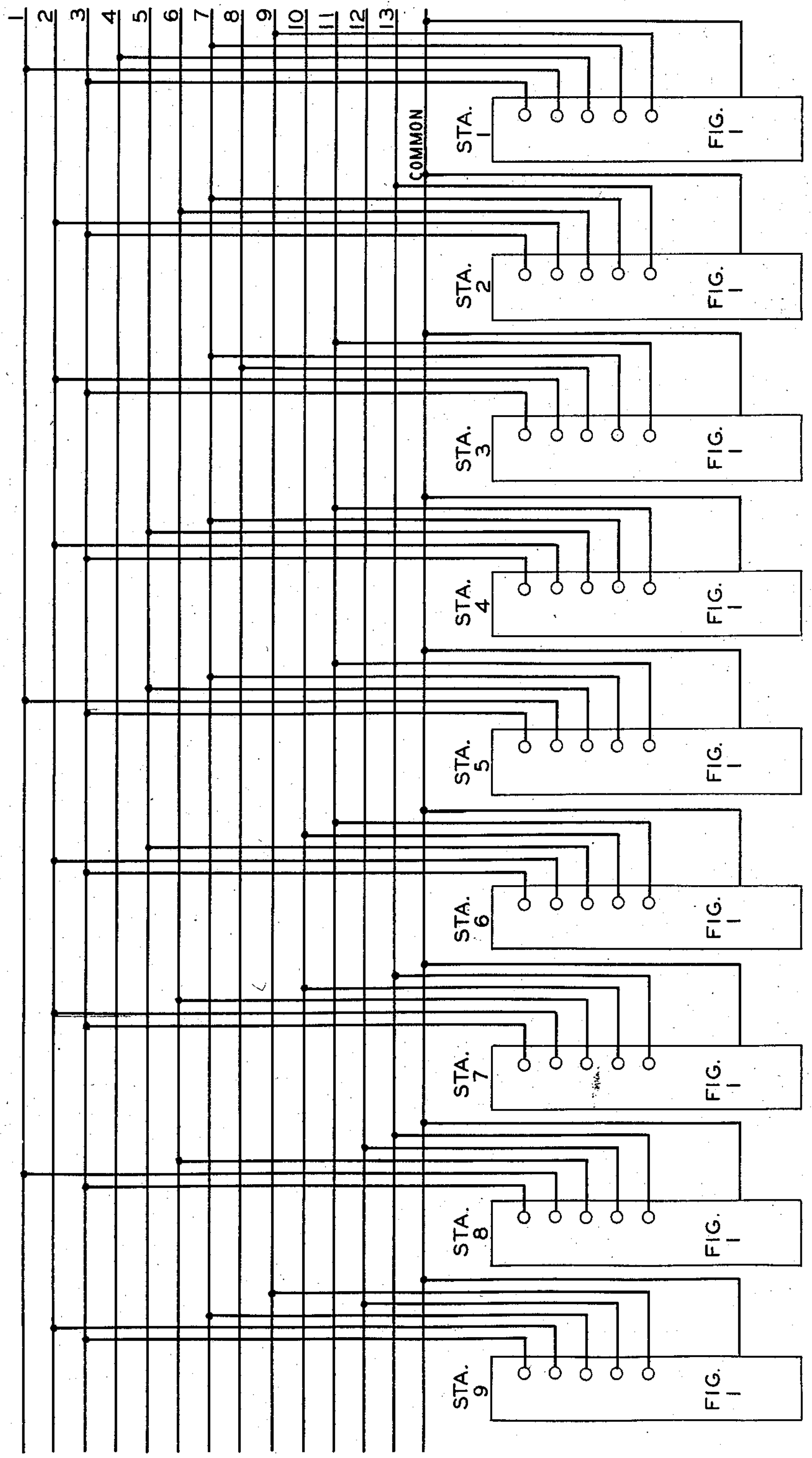
Fig. 2 is a schematic circuit diagram showing a plurality of stations and indicating how each may be connected to the various circuits multipled in common to all of said stations.
Figure 4:
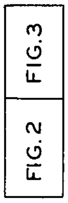
Fig. 4 is a block diagram on the same sheet with Fig. 2, showing how Figs. 2 and 3 may be placed to provide an overall schematic diagram of a key telephone system.
Figure 3:
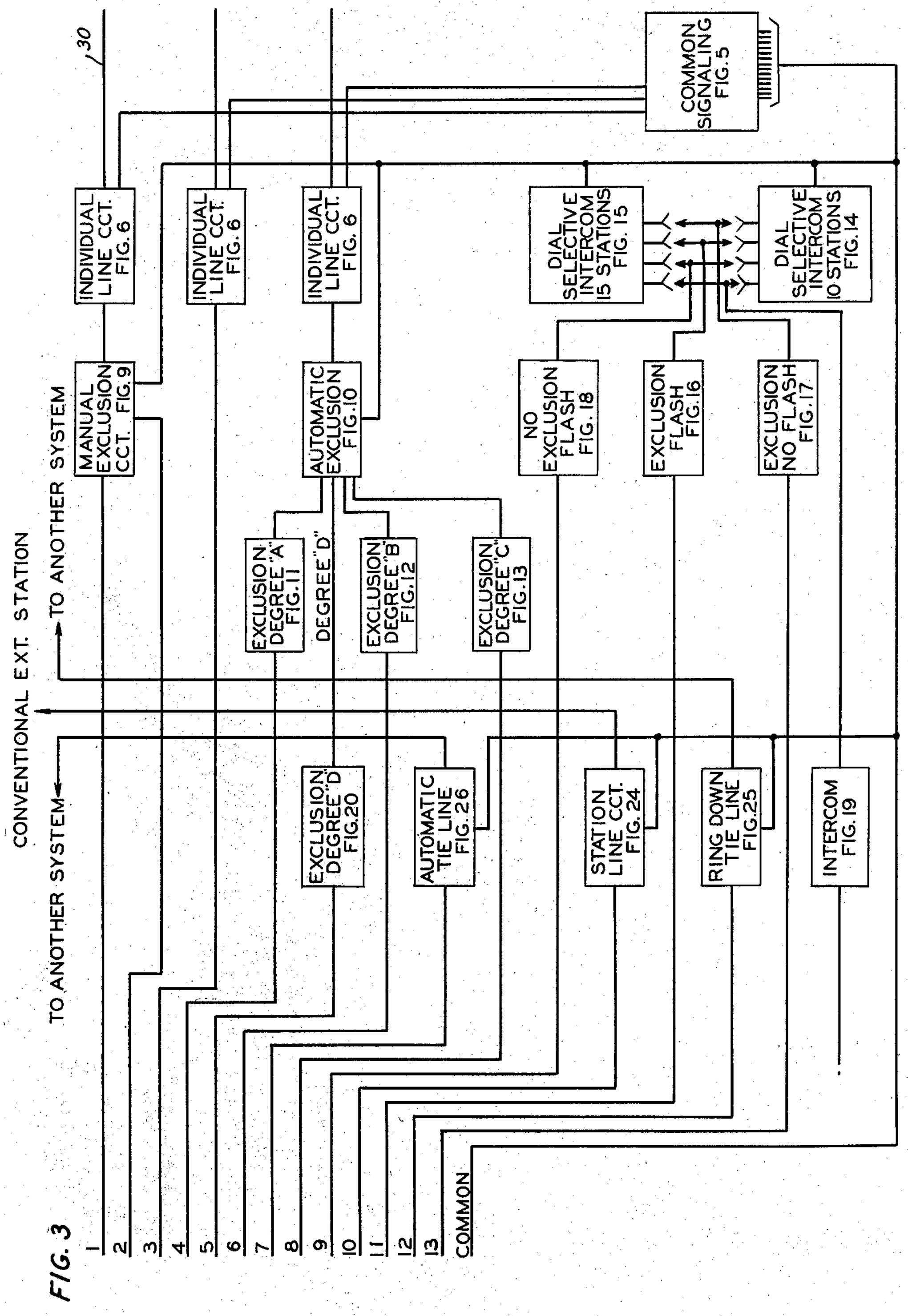
Fig. 3 is a combination block and schematic circuit diagram showing how the various circuit arrangements for providing various operating features are related one to the other and how the various service features are provided by the multipled circuits extended to the station of Fig. 2.

Let us assume that the five conductors T, R. H, L, and C, represented by the channel 3 leading from Fig. 3 to Fig. 2 are connected to the conductors T1, R1, H1, L1 and C1 (Fig. 1) of station 1 of Fig. 2. This will connect the flashing signal to the incoming and hold lamp 26 and the circuit will be completed over the C conductor to the A. C. ground wire (17 in the multiple of common wires) in the individual line circuit Fig. 6. This lamp in all stations (stations 1 to 9 inclusive as indicated in Fig. 2) will thus flash periodically as an indication of an incoming call.

It is noted that the operation is the same when the line key 1 is not operated as shown in Fig. 1 or when it is operated.

Let it be assumed that the subscriber at station 1 responds to the flashing call signal by operating his line key 1 and removing his handset from its cradle, thus operating his hook switch contacts to the position shown in Fig. 1. Fig. 7 is a fragmentary sketch showing certain connections between the common equipment conductors and the internal connections of the telephone station, left blank in Fig. 1 for greater ease of pointing out such connections used in different features by such fragmentary sketches. Fig. 7 shows a cross connection between ground (common conductor 26 from Fig. 5) to the telephone set terminal marked +24 v. D. C. from where a connection may now be traced through the closed "W" hook switch contacts, the closed contacts of the common hold key 6, a now closed connection among the springs of line key 1 to the H1 terminal, thence to the H terminal of Fig. 6, the winding of the LR relay 10 to battery. The relay 10 operates, disconnects the circuit of the ring up relay 11 and opens the circuit of the thermal relay 18 to release the operating means in the common circuit, Fig. 5. The circuit for the lamp 26 is now switched from the flash connection by armature 22 of relay 16 to an armature and front contact of the LR relay 10 and thence to the steady source of lamp current (common conductor 18 of Fig. 5) so that the lamp ceases to flash as a calling signal and now glows steadily as a busy signal.

Relay 10, through one set of contacts, short circuits the upper winding of the hold relay 25 and through another set short circuits the lower winding thereof, in order to improve the transmission of the circuit by removing unnecessary impedance. Relay 10 also operates the PF relay 27 so that the HD relay 25 may be operated if that becomes necessary.

In the station set the tip and ring conductors are connected to the substation talking and dialing circuit and the bridge thereof operates as a signal in the central office that the call has been answered.

If the particular party wanted is not the person who has answered the call, then this subscriber at station 1 will momentarily depress the common hold key 6 which will result in the release of the relay 10. Relay 10 removes the short circuit from about the windings of the hold relay 25 and since the line key 1 remains operated for a slight interval after the common hold key is operated, the bridge of the telephone set causes this hold relay to operate. Relay 25 thereupon interconnects the tip and ring and thereby locks itself into operation and this condition will be maintained until another party comes on the line and again operates the LR relay 10 or until the central office line is opened to release the holding relay. It is to be noted that the PF (power failure) relay 27 is slow releasing so that as relay 10 releases and during the fleeting instant before the HD relay 25 is operated, this relay 27 will not release. The relay 27 is provided so that should the power fail in this key telephone system, the line could be used conventionally.

While the hold relay 25 is operated, the start flash conductor will be grounded so as to cause the flash relay 21 and the wink relay 24 to operate as hereinbefore described. The HD relay 25 changes the connection of the L conductor from the steady source of current to the wink conductor so that the lamp 26 by its characteristic operation will signal all stations that the associated line is being held.

When the wanted party is found he will, by going in on the line, again operate the LR relay 10 and will thus release the hold relay by shortcircuiting its windings. At the end of the conversation, when the handset is replaced on its cradle, the line will be released in conventional manner.

Where it is desired to have an extension bell either at one or more stations or at some central location where it may be heard by many of the subscribers, then the optional "A" connection is made at the individual line circuit Fig. 6 and at one or more of the stations where the cross connections of Fig. 8 are provided. Thus on an incoming call, each time the ring up relay RU is operated, power from the 30 cycle 2 ring or 60 cycle 2 ring supply is connected to the common conductor 24 and at the station through the extension bell 28 (Fig. 8) the "Z" hook switch contacts when the handset is on its cradle, to the A. C. ground, common conductor 17. The bell will sound until the subscriber removes the telephone and thus operates the hook switch to open the ringing circuit.

Where there are several central office lines and each of the individual line circuits is provided with this "A" optional wiring, then the bell 28 will operate for all so that the subscribers will know that there is an incoming call but will have to determine on which line it is by looking for the flashing signal lamp. Where there are several central office lines but not all have this optional wiring, then the bell will sound for those wired for it and remain silent on calls incoming over the others.

*Manual exclusion*

Conventionally the cradle of the telephone set has two buttons which the handset depresses when it is placed thereon. These buttons operate the "hook switch" consisting of the W, X, Y and Z contacts shown in Fig. 1. One of these hook switch buttons may be separately twisted while the telephone is being used and when so twisted will operate a switch which will thereafter be automatically restored to normal when the handset is replaced on its cradle. This button then may be used for exclusion purposes, that is to cut off certain telephone sets under the control of certain others, as shown in Fig. 9. As indicated ing Fig. 2, station 1 is in a superior position as it has service over the central office line 30 through the manual exclusion circuit Fig. 9 and may cut off service to stations 2, 3 and 4. Included in the cable or set of conductors extending from the circuit of Fig. 9 to the various stations are the two marked E1 and E2 which will be found in Fig. 1 to lead to the exclusion switch 31. These conductors are connected at the control set to the switch 31 thereat.

The subscriber at station 1 may operate the exclusion switch at any time either before or after one of the stations 2, 3 or 4 have come on the line and thus action will unceremoniously cut off these stations. When the subscriber at station 1 comes on the line the ground which he places on the conductor H to operate the LR relay 10 will pass through the CL relay 32 (Fig. 9) and will close a contact so that ground on conductor E1 extended by the exclusion switch 31 to the E2 conductor will operate the CO relay 33 thus cutting off the extension of the T, R and H conductors to the subordinate stations 2, 3 and 4.

It is to be noted that the lamp circuits C and L to the subordinate stations are not disturbed so that subscribers thereat will be able to note the condition of a line which they may find has been cut off. It is also to be noted that several stations (such as stations 1, 5 and 8 in Fig. 2) may have control of the manual exclusion circuit and that any one thereof may cut off the remainder though no one of such controlling stations may be cut off even by another controlling station.

*Automatic exclusion*

There is provided, where there is a subscriber demand for such service, an automatic exclusion means in which there are four degrees of operation, as follows.

(*a*) Stations which can cut off other stations but which cannot be cut off, shown in Figs. 10 and 11.

(*b*) Stations which can cut off other stations and can be cut off except when a controlling station operates during a call, shown in Figs. 10 and 12.

(*c*) Stations which cannot cut off others and which can be cut off except during a call, shown in Figs. 10 and 13.

(*d*) Stations which cannot cut off others and can be cut off at any time, shown in Fig. 10 alone.

It is to be noted that the automatic exclusion circuit, Fig. 10, consists essentially of a cut off relay 34, which operated, cuts off the T–1 and R–1 conductors leading out to the stations in this system. For the *a*, *b* and *c* degrees of operation, the control circuits Figs. 11, 12 and 13 respectively are used. For the *d* degree, the outgoing conductors are the T–1, R–1 and H–1 conductors, as indicated in Fig. 20. Since stations, such as 4, 5 and 6 of Fig. 2, are indicated as having their line keys 4 associated with the channel 5 (Fig. 3) issuing from Fig. 20, it may be noted that any other station of this system, such as station 1, degree *a*, channel 4 from Fig. 11, and stations 2, 7 and 8, degree *b*, channel 6 from Fig. 12, may operate the cut off relay 34 at any time and thereby open the tip and ring conductors to the controlled stations 4, 5 and 6. As in the manual exclusion circuits, the signal lamp circuit is not disturbed so that a subscriber at one of these stations 4, 5 and 6 finding his line dead or even unceremoniously cut off during a call, may note by the busy indication that the line has been taken for use by a superior.

It may be noted in connection with Figs. 12 and 13, that if a superior station such as station 1, 2, 7 or 8 is using the line that the hold conductor 35 will be grounded.

Let us first consider the degree A line such as channel 4, to which station 1 only has access. When the subscriber at this station operates his line 3 button and lifts his telephone from its cradle, he immediately grounds the H1 conductor whereupon the B relay 36, Fig. 11, is operated and this without exception causes the operation of the CO relay 34, Fig. 10, so that all other stations are cut off and prevented from using the central office line. The only exception to this cut off is when a priority B (Fig. 12) line is already using the line and its B relay 37 is operated or when a priority C (Fig. 13) line is already using the line and its B relay 38 is operated, in which case such connections cannot be disturbed although the priority A subscriber may listen in or join in the conversation. Since the cut off relay 34 cannot prevent the operation of the B relay 36, the priority A subscriber cannot be excluded from the circuit. The B relays 36, 37 and 38 are provided to override the break in the tip and ring conductors opened by the CO relay 34 and any one of these operated before the cut off relay may hold an established connection but the B relay 36 is the only one which may be operated after the cut off relay has been operated.

It may further be mentioned that the signal lamp conductors parallel these circuits though they are not included in any operating means therein.

Each hold wire has included therein a diode such as the diode 39 to prevent the operation of any other B relay since all the H1 wires are multipled in the cut off relay circuit Fig. 10.

In the case of a priority B station such as the stations 2, 7 and 8 given service over a circuit Fig. 12, if the line is already in use and the CO relay 34 is operated, then the battery connection over the CP wire is cut off and such a station cannot operate its B relay 37 so that it is impotent until the line is released and the CO relay 34 returns to its unoperated condition. After a priority B station, however, has successfully seized the line it cannot be cut off even though some other line may operate the CO relay 34, for the B relay 37 having operated locks into an energizing circuit independent of the cut off relay.

In the case of a priority C station it will be noted that such a station cannot operate the cut off relay and therefor cannot cut off any other line though it cannot be cut off as long as its B relay 38 is maintained operated.

In the case of a priority D station, connected to the wires of the circuit of Fig. 10 through Fig. 20, it will be noted that such a station cannot operate the cut off relay 34 and may be unceremoniously cut off at any time.

Another type of service provided is that known as the dial selective intercom circuit where one button, usually number 5, of each station is used for this intercommunicating purpose. It is arranged so that any station may have access to the intercom channel and each may dial any one or more of the others. Fig. 14 shows the common circuit for a 10 station system (one pull of the dial) and Fig. 15 shows a similar circuit for a 15 station system (two pulls of the dial). In each case a minor switch is used which follows the dial of the calling subscriber, momentarily signals the called station, locks it in to the intercom circuit in case it is equipped with an exclusion circuit and then releases and is ready to be operated again either to recall the called station or to call in another and different called station, possibly for conference purposes. It is indicated in Fig. 3, that the exclusion and flash circuits, Figs. 16, 17 and 18 and the simple intercom circuit, Fig. 19, will work out of either type of common circuit equally well.

Let the simplest type of intercom circuit, that shown by Fig. 14 and Fig. 19, be considered. With such an arrangement it will be noted that when the subscriber who wishes to use this intercom service depresses his number 5 key and lifts his telephone from its cradle, he will be supplied with talking battery over the tip and ring conductors through the windings of the PL relay 40 (Fig. 14) and that this will cause the immediate operation of the first slow release delay RD relay 41. The RD relay, through the normally closed off normal contacts 49 operates the XD relay through its upper winding and this relay in turn operates the XD1 relay 46 over an obvious circuit. The condenser 47 is placed in a charging circuit. The XD relay 42 opens the circuit of the switch wipers 44 and 45 while the XD1 relay acts to close these same circuits.

When the subscriber dials, ground will be passed for each dial pulse over the back contact of the PL relay and a front contact of the slow releasing RD relay to a circuit extending in one branch through the lower winding of the slow release XD relay 42 and on another branch through the winding of the minor switch magnet 43. The minor switch steps its wipers 44 and 45 to a corresponding set of contacts. The XD relay remains operated during the dialing and shortly thereafter and as controlled by its slow releasing characteristics, releases.

On the first step of the minor switch the normally closed off normal contacts 49 open so that the XD relay may release at the end of the train of pulses and when this release takes place the principal operating circuit of the XD1 relay is allowed to release, but this takes a significant interval due to the size of the condenser 47. During this interval the called subscriber is signalled.

The signaling circuit may be traced from a source of 10 volts 60 cycle current through an armature and front contact of the RD relay 41, an armature and back contact of the XD relay 42 now released, an armature and front contact of the XD1 relay, switch wiper 44, the wire 50 to the called station, over the conductor 51 of Fig. 19 to the 1C2 conductor, individual to the called station, thence over the connection shown in Fig. 21 through the intercom buzzer, the "Z" hookswitch contacts (closed) when the station is idle to the A. C. ground. It may be stated at this point that there is a pair of individual wires for each station from the circuit of Fig. 14 and the circuit of Fig. 15, one marked G in these figures and connecting to the 1C2 conductor in Figs. 16, 17, 18 and 19 for operating the intercom buzzer and one marked S in Figs. 14 and 15 and extending to the flash relay and the connector relay in the circuits Figs. 16, 17 and 18 (the S conductor is dead ended in Fig. 19). Thus during the release time of the XD1 relay 46 the calling signal (of a few seconds duration) is sounded at the called station. At the same time the lamp associated with this number five button will be steadily aglow in a circuit from the A. C. source of 10 volts, an armature and front contact of the RD relay the BY conductor which connects directly in Figs. 17 and 19 and normally in Figs. 16 and 18 to the L5 conductor through all the lamps in parallel on this intercom circuit, the conductor C5 in all four circuits to the C conductor carrying the A. C. ground.

At the end of this period, when the XD1 relay 46 releases, a circuit will be extended from ground, an armature and front contact of the RD relay, an armature and back contact of the XD relay, an armature and back contact of the XD1 relay the now closed off normal contacts 51 to the release magnet 52, whereby the minor switch is released and the circuit returns to the condition just before the dialing operation took place, with all four relays PL, RD, XD and XD1 operated.

If the called subscriber does not answer promptly, the calling subscriber may recall him, or alternatively the calling subscriber may call any other party or several other parties for conference purposes. As soon as some one other party answers so that the PL relay will no longer respond to the dial at the calling station this calling of other subscribers on the intercom circuit will no longer be effective. At the end of a conversation the release of the last party thereto releases the PL relay and the others release in turn.

The operation of the common circuit for two digit calling shown in Fig. 15 is the same as that just described with respect to a single digit. When the intercom circuit is seized, the PL relay 53 is operated and this causes the operation of the RD relay 54. This in turn causes the operation of the XD relay 55 through the normally closed off normal contacts 58 and the operation of the XD1 relay 55 through a front contact and armature of the XD relay. The XD2 relay 57 follows the operation of the XD1 relay by an obvious energizing circuit. Alternating current for operating the intercom buzzer is transmitted over wiper 59, level A, as before when the XD1 and XD2 relays remain operated for a short interval after the XD relay has released. Again the called station may be recalled or some other station may be called if this is done while the calling station is the only one in control of the PL relay 53.

It should now be noted, that if the digit dialed is a 0 (ten pulses) that during the normal buzzer operating interval, the wiper 60 will close a circuit to the upper winding of the SW switching relay 60 and this in turn will operate the WS relay 61. The SW relay will lock through the ON contacts 58 until the minor switch is released and the WS relay will lock and remain locked under control of the SW relay.

However, as soon as the SW relay operates it closes the releasing circuit for the switch so that the wipers return to their normal positions. As the ON switch returns to normal the holding circuit for the SW relay 60 is opened but this relay does not actually release until a locking circuit is provided for the WS relay 61. Thus if the first pull of the dial is 0, no station will be selected but the switch wipers will be switched and the WS relay will be operated and locked.

The calling subscriber will then operate the dial a second time and here the operation is the same as before, a station line being selected and then a signaling period being provided by the momentary holding of the XD1 and XD2 relays. During this holding period of the XD1 and XD2 relays, the switch wiper 62 will be effective to operate the intercom buzzer at the called station. Thus it will be seen that the minor switch may be operated and released and that it will cause the intercom buzzer at the called station, characterized by either a one or two digit address, to be sounded.

In the manner hereinbefore described in connection with Fig. 14, the S wire leading in Figs. 16, 17 and 18 to the flash and exclusion circuits will momentarily be grounded to start the flash circuit and to operate and lock in the connector relay of the exclusion circuit.

Looking now at Figs. 16 and 18 it may be noted that during the intercom buzzer operating period, ground on the S wire will operate the FL relay through a back contact of the LR relay to battery and that the FL relay will lock to the N conductor grounded by the RD relay 41 of Fig. 14 or the RD relay 54 of Fig. 15. The FL relay, operated, will ground the Start Flash conductor whereby a flash signal will be substituted on the L5 wire in place of the steady potential on the BY conductor. Thus the signal lamp at the called substation will be flashed as a calling signal in addition to the sounding of the buzzer thereat. When the called party answers, the LR relay will respond and this will release the FL relay so that the lamp goes steadily aglow.

Looking now at Figs. 16 and 17 it will be noted that the momentary signal on the S wire from Fig. 14 or Fig. 15 will pass through the diode 63 to operate the CN connector relay.

When a calling subscriber calls, he grounds the H5 conductor and in his particular exclusion circuit causes, first an operation of his CN connector relay and following that the CO cut off relay. It will be especially noted that all the CO relays are connected in parallel and that on a call all operate simultaneously and thereby prevent the operation of any other CN relay with the exception of the first to operate by the calling subscriber and any other specifically operated by the above described momentary grounding of an S wire. Therefore when the CN relay is thus specifically operated, its associated CO relay will have been previously operated so that the CN relay will lock and remain locked until the intercom circuit is released by the last party to hang up.

It will be seen that the combination of the plurality of CO relays thus virtually constitute a single multicontact relay having a plurality of contacts and armatures in the separate exclusion circuits employed. This one large relay may be operated by the calling subscriber and held under control of each subscriber to the conference so that it will not be released until the last party retires.

*Common code signaling intercom*

The common code signaling intercom system is one in which the number 4 button at each substation is used to bring the subscriber in on a talking circuit and in which the number 5 button is freed from the locking mechanism used to hold any button pressed into its operated position, the number 5 button being used as a signaling means which the calling subscriber may operate in code. For this arrangement the crossconnections shown in Fig. 22 are made. The strap G shown in Fig. 1 is removed and the tip and ring terminals of key 4 are connected to a common coil 64 (Fig. 5) which supplies talking battery to the intercom circuit. The 10 volt 60 cycle source of signaling current is connected to the H5 terminal and the 1C1 terminal of the telephone set is crossconnected to the 1C1 common conductor which thus forms a common point. Any one subscriber operating his number 5 button will thus connect the 10 volt 60 cycle signaling battery to the common 1C1 conductor and this at all other stations will find a path through the back contact of the number 5 button to the 1C2 conductor and thence through the intercom buzzer to the A. C. ground. The calling subscriber may operate his button in code to thus call in a particular called subscriber or a particular group of called subscribers in accordance with the prearranged and known meaning of the code.

*Key selective intercom*

By mounting a set of simple push buttons at each station and including a set of wires one individual to each station to have this service in the common cable, an intercom service may be provided by which any one station may selectively signal another. The arrangement made is shown in the cross connecting pattern of Fig. 23. When some other station has button 65 operated, the 10 v. 60 cycle signaling battery common to the buttons will be connected to the line 66, and at the particular station where this line is connected to the 1C2 terminal it will operate the intercom buzzer thereat. Talking battery may be provided as before by a connection of the intercom coil 64 to the T5 and R5 terminals, the number 5 station button being used in this case.

*Station line circuit*

Service may be provided between a station included in the key telephone system and a conventional telephone station at a distance and which is reached over a conventional two wire circuit rather than over the multiconductor cable extended in common to the stations of the present key telephone system. In Fig. 2, stations 6 and 7 are shown as having a connection to a channel extending in Fig. 3 through the station line circuit Fig. 24 leading to a conventional extension station.

Looking at Fig. 24, it may be noted that when the subscriber at station 6 or station 7 wishes to get the party on this extension station he operates the proper button (herein indicated as button 4) whereupon with his telephone off its cradle he will cause the operation of the CB, calling bridge relay 70. This relay operates and causes the operation of the CBA relay 71 over an obvious circuit. The CBA relay connects the steady 10 volt 60 cycle source to the L conductor leading to the calling station whereby the lamp associated with the operated button comes steadily aglow. The CB relay 70 also closes a circuit from ground, its armature 72 and front contact, the normal back contact and armature 73 of the ST relay 74, the back contact and armature 75 of the AB1 relay 76, and the winding of the BZ relay 77 to battery. The BZ relay 72 operates and the condenser 78 charges. The operation of the BZ relay closes an operating circuit for the lower winding of the ST relay 74 which operates, locks to the ground supplied by the CB relay 70 and opens the original circuit for the BZ relay 77. This relay, however, is held operated for a short interval while the condenser 78 is discharging.

During the short interval while the BZ relay 77 is operated, a circuit is extended from the ground supplied by the CB relay 70, over an armature and back contact of the AB1 relay 76, an armature and front contact of the BZ relay and the winding of the RO relay 79 to battery. The RO relay applies ringing current to the distant called station. Thus it will be clear that immediately the subscriber at the key telephone station calls, the distant conventional station will have a short ring applied thereto.

If the distant called subscriber lingers, the calling subscriber may hang up and repeat the call.

When the distant subscriber answers, the answering bridge AB relay 80, and in turn the AB1 relay 76, operate. The AB1 relay 76 opens the circuit for the RO relay 79 so that the calling station cannot again cause the application of ringing current to the called line.

If the CB relay 70 is the first to be released, the ST relay 74 will be maintained from a front contact of the AB1 relay 76 and the back contact of the CBA relay 71. Thereupon the flash lead will be connected through an armature and front contact of the AB1 relay 76 and a back contact and armature of the CBA relay 71 to the L lead to cause the lamp at the calling station (now released) to flash. The flash lead is activated since a circuit from ground, the armature 72 and back contact of the CB relay 70, is extended through an armature and front contact of the ST relay 74 to the start flash lead.

When the called subscriber hangs up, the rest of the relays restore and the circuit assumes its normal unoperated condition. If the called subscriber hangs up first, the AB relay 80 and the AB1 relay 76 release but the ST relay is held under control of the CB relay.

On an incoming call from the distant station the AB relay 80 and the AB1 relay 76 operate. The AB1 relay causes the operation of the BZ relay which now merely causes the operation and locking of the ST relay 74 but does not cause the RO relay 79 to operate. The flash conductor is connected through a front contact of the AB1 relay 76 and a back contact of the CBA relay to the L conductor to cause the station lamp to flash.

During the short interval of operation of the BZ relay 77, the steady 10 volt 60 cycle source is connected through a back contact of the CBA relay 71, a front contact of the AB1 relay and a front contact of the BZ relay 77 to the interrupted source of signaling current to provide immediate ring should the operation be started during a silent period.

The optional "A" wiring heretofore described is used where an extension bell is used at the called key telephone station.

When the called subscriber answers, the CB relay 70 and the CBA relay 71 respond and the station lamp then burns steadily. Thereafter the operation is the same as heretofore described.

*Ring down tie line circuit*

The ring down tie line circuit is a means for intercommunicating with subscribers grouped on another key telephone system and particularly where the said two systems are so distant one from the other that an automatic tie line would be impractical. Here a subscriber (Fig. 25) makes a connection to such a tie line in a conventional manner and then operates a push button ringing key 81 (Fig. 27) to operate the RG relay 82 which thereupon connects ringing current (either 30 cycles or 60 cycles) to the T1 and R1 conductors leading to the distant key telephone system. At this near end shown in Fig. 25 the calling bridge CB relay 83 will be operated to supply talking battery to the calling subscriber. The operation of the CB relay connects the source of steady 10 volt 60 cycle current (common conductor 18) to the L lead which causes the lamp associated with the operated button to burn steadily as a busy indication to others in this key telephone system who have access to this ring down tie line. At the same time the CB relay establishes a talking circuit to the tip and ring conductors of the tie line which connection is completed when the ringing relay 82 is released.

At the distant end, ringing current coming in over the tie line will find a circuit through the thermistor 84 and the SG relay 85 and when the thermistor heats up sufficiently to pass enough current the SG relay 85 responds. This relay then causes the operation of the SG–1 relay 86, which locks in to the ground supplied by the back contact of the thermal relay 18 in the common circuit (Fig. 5). The SG–1 relay starts the flashing circuit so that the flash signal is transmitted over the L conductor to the lamp at the distant end to signal an incoming call. If the optional A wiring thereat is completed, an extension bell thereat will be operated as before described. When the call at the distant end is answered, the CB relay thereat will operate and this will release the SG–1 relay to release the common circuit operation and the lamp thereat will go into steady operation as a busy indication. At the end of the conversation the CB relays at each end will release and the circuit will be restored to normal.

*Automatic tie line circuit*

An automatic tie line circuit is shown in Fig. 26 and the fragmentary cross connection pattern in Fig. 28. Service over this circuit interconnecting two similar key telephone systems is on an automatic basis.

The calling subscriber operates the button wired for this tie line and lifts his telephone from its cradle thus causing the operation of the calling bridge CB relay 87. This results in the operation of the CBA relay 88 and this reverses the battery supply from the windings of the AB relay 89 to the tip and ring conductors resulting in the operation of the AB relays at both ends of the tie line.

At the near end where the CB relay 87 and the CBA relay 88 are operated, the operation of the AB relay will cause the SR relay 90 to operate and to then lock under control of the CBA relay 88 without other result than to open the circuit of the BZ relay 91. The CBA relay 88 connects the signal battery (10 volts 60 cycles) to the L conductor to cause the lamp to light steadily as a busy signal.

At the distant end where the CB relay and its slave the CBA relay are not operated, the operation of the AB relay will ground the start flash conductor 21. At the same time a circuit will be established from ground, an armature and front contact of the AB relay 89, an armature and back contact of the CBA relay 88, a back contact and armature of the ST relay 92, an armature and back contact of the SR relay 90 and the winding of the BZ relay 91 to battery. The BZ relay 91 operates (momentarily) and causes first the operation of the ST relay 92 and then the operation of the SR relay 90. The ST relay locks now under control of the AB relay and the SR relay 90 holds under control of the ST relay. The SR relay opens the circuit of the BZ relay 91 but the discharge of the condenser 93 holds the BZ relay operated for a short interval.

At this distant end, the flashing circuit is activated until a called subscriber thereat answers. In the meantime, the lamps associated with this incoming tie line circuit will flash as a calling signal. Also momentarily, the BZ relay 92 will temporarily connect the 10 volt 60 cycle source (common conductor 18) to the common conductor 16 which at each of the substations arranged as shown in Fig. 28 will cause the common line signal buzzer to operate. Also, if the optional A wiring is provided, a ringer (see Fig. 8) may be operated to thus provide a momentary audible signal.

When a called subscriber answers, the distant CB relay 87 and its slave the CBA relay 88 will operate and since the line from the AB relay thereat is reversed, both the AB relays will release. At the calling end the SR relay will remain locked under control of the CBA relay and at the distant end the ST relay will release but will complete a locking circuit for the SR relay thereat. The operation of the distant CBA relay will change the lamp signal from flashing to steady as a busy signal.

When the conversation is over, let it be assumed that the subscriber at the near end hangs up first. His CB relay 87 and his CBA relay 88 will be released and both the AB relays will be operated again. At the near end the slow releasing relay SR will hold until its locking circuit from the front contact of the AB relay can be established so that now the AB relay and the SR relay at this near end will be operated. This will operate the flashing circuit so that the lamp at the substation will flash as a signal that the called subscriber at the distant end has not yet released. At the distant end the operation of the AB relay there will have no other effect than to establish a circuit for delaying the release of the SR relay momentarily upon the eventual release of the connection by the said called subscriber.

When this called subscriber does release, the circuit is restored to normal at both ends of the connection.

If this automatic tie line circuit is connected in to a line where a manual exclusion circuit (Fig. 9) is used to provide a degree of priority between two or more subscribers, then a battery connection, as indicated in Figs. 26 and 28, is provided for the H terminal for the operation of the CL exclusion relay.

What is claimed is:

1. In a telephone system, a common communication channel, a plurality of stations associated with said channel, an exclusion circuit for each of said stations and a common control circuit for all of said stations, each said individual exclusion circuit having a connector relay for connecting its said associated station to said channel and a cut off relay responsive to the operation of its said associated connector relay, all said cut off relays of all said exclusion circuits being connected in parallel whereby an operating circuit closed for one of said cut off relays will operate all thereof, said cut off relays associated with nonoperated connector relays controlling means to prevent subscriber controlled operation of said associated connector relays; and means in said common control circuit for selectively operating one of said nonoperated connector relays.

2. In a telephone system, a common communication channel, a plurality of stations associated with said channel, an exclusion circuit for each said station and a common control circuit for all said stations, each said individual exclusion circuit having a connector relay for connecting its said associated station to said channel and a cut off relay responsive to the operation of its said associated connector relay, all said cut off relays being connected in parallel whereby an operating circuit closed for one thereof will operate all thereof, said cut off relays associated with nonoperated connector relays opening subscriber controlled means for operating said associated connector relays, and subscriber controlled means in said common control circuit for selectively operating said nonoperated connector relays.

3. In a telephone system, a common communication channel, a plurality of stations associated with said channel, an exclusion circuit for each said station and a common control circuit for all said stations, each said individual exclusion circuit having a connector relay for connecting its said associated station to said channel and a cut off relay responsive to a prior operation of its said associated connector relay, all said cut off relays being connected in parallel whereby an operating circuit closed for one thereof will operate all thereof and means for establishing a connection between two stations including a means in said common circuit responsive to a calling station for the selective post operation of one of said connector relays, the continued operation of said cut off relays being under the sole control of said calling station including in its said exclusion circuit the said prior operated connector relay.

4. In a telephone system, a common communication channel, a plurality of stations associated with said channel, an exclusion circuit for each said station and a common control circuit for all said stations, each said individual exclusion circuit having a connector relay and a cut off relay, a first circuit extending from a said station into its associated exclusion circuit and a second circuit extending from said common control circuit into said exclusion circuit, a cut off relay operating circuit, said cut off relay being responsive to said first circuit for operating said connector relay and unresponsive to said second circuit for operating said connector relay and a diode in said first circuit for blocking operation of a connector relay from said cut off relay operating circuit.

5. In a telephone system, a common communication channel, a plurality of stations associated with said channel, an exclusion circuit for each said station and a common control circuit for all said stations, each said individual exclusion circuit having a connector relay and a cut off relay, said cut off relays being connected in multiple, each said connector relay having means to extend subscriber control to its said associated cut off relay and each said cut off relay locking its said associated connector relay into operation whereby an established connection is maintained under control of the last party to release.

6. In a telephone system, a common communication channel, a plurality of stations associated with said channel, an exclusion circuit for each said station and a common control circuit for all said stations, each said individual exclusion circuit having a connector relay for connecting said associated station with said common channel and a cut off relay for barring subscriber operation of said connecting relay subsequent to the operation of said cut off relay, means in said common control circuit operable by a calling subscriber for selectively operating said barred connecting relays and means controlled by said associated cut off relays for locking said selectively operated connecting relays into operation.

7. In a telephone system, a common control circuit and a plurality of controlled circuits, an individual conductor from said common circuit to each of said controlled circuits, a step by step switch in said common control circuit, means for operating said step by step switch to select a given one of said individual conductors, means in a said controlled circuit reached by said associated selected individual conductor for locking in a selection signal and means for thereupon releasing said step by step switch to its normal condition ready for another like operation.

8. In a telephone system, a common control circuit and a plurality of controlled circuits, a common telephone channel and a plurality of telephones, each said telephone terminating in one of said controlled circuits and being normally disconnected from said common channel, means responsive to a first one of said telephones in making a call to operate its said controlled circuit to connect itself to said cmmon channel, means responsive to said first established connection for rendering all other said controlled circuits unresponsive to calls from their associated telephones, a selecting means on said common channel in said common control circuit responsive to said first connected telephone for selecting and signaling any desired one of said controlled circuits and for signaling the said associated telephone, means responsive to said selection and signaling for connecting the said selected telephone to said common channel and for locking said connection, and means for recalling said called telephone or, alternatively, for calling and locking in any one or more of said controlled circuits and their associated telephones.

9. In a telephone system, an intercommunication channel, a plurality of telephone stations, an exclusion circuit for each said telephone station, each said exclusion circuit having a connector relay for connecting said associated telephone station to said intercommunication channel and a cut off relay, said connector relay being responsive to its said associated telephone station over a circuit controlled by said cut off relay not operated and unresponsive thereto under control of said cut off relay operated, a selecting device terminating said intercommunication channel having selective access to said connector relays, each said connector relay being responsive to said selecting device over a circuit independent of said cut off relay, and means in said intercommunication selecting device for transmitting signaling current to a selected station, said selecting device being constructed and arranged to automatically return to normal following a said selecting and signaling operation.

10. In a telephone system, an intercommunication channel, a plurality of telephone stations normally disconnected from said channel, a connector circuit for each said station for connecting said station to said channel, a selecting switch terminating said channel, means for operating said switch to selectively enable said connector circuits, means for automatically returning said switch to normal following each said selective enablement operation and means operative during each said operation for transmitting a calling signal to the station selected.

11. In a telephone system, an intercommunication channel, a plurality of telephone stations normally disconnected from said channel, a connector circuit for each said station for connecting said station to said channel, a selecting switch terminating said channel, means for operating said switch to selectively enable said connector circuits, means for automatically returning said switch to normal following each said selective enablement operation, means operative during each said operation for transmitting a calling signal to the station selected, said switch having a plurality of levels for reaching a plurality of groups of said telephone stations and means responsive to the selection of a particular line termination in a first selecting operation of said switch to enable said switch for a succeeding operation for selecting a line termination in another switch level accessible thereto.

12. In a telephone system, an intercommunication channel, a plurality of telephone stations connectible thereto, a connector circuit for each said station for connecting said station to said channel, a selecting switch terminating said channel, means for operating said switch to selectively enable said connector circuits, means for automatically returning said switch to normal following each said selective enablement operation, said switch having a plurality of levels for reaching a plurality of groups of said telephone stations connected to line terminations grouped in said levels, means connected to a particular line termination in a first of said levels to prepare said switch to select a line termination in a second of said levels on a succeeding operation of said switch.

13. In a telephone system, an intercommunication channel, a plurality of telephone stations connectible thereto, a connector circuit for each said station for connecting said station to said channel, a selecting switch terminating said channel, means for operating said switch to selectively enable said connector circuits, said telephone stations having one and two digit addresses, means for operating said switch once to selectively enable a said connector circuit for a one digit address or, alternatively, for operating said switch successively twice to selectively enable a said connector circuit for a two digit address, means for automatically returning said switch to normal following each said selective enablement operation and means operative during the first operation of said switch in a one digit enablement operation or, alternatively, during the second operation thereof in a two digit enablement operation for transmitting a calling signal to the station thus selected.

14. In a telephone system, an automatic tie line circuit for establishing a connection between two telephone systems comprising a two conductor circuit having a local termination for each said system, each said termination including a local circuit provided with a battery feed relay, said local battery feed relay having means for reversing the conection of said tie line battery feed relay to said tie line, said tie line battery feed relays at the opposite ends of said tie line operating together and being responsive to an odd number of reversals therebetween and unresponsive to an even number of reversals, therebetween.

15. An automatic tie line circuit for establishing connections between two independent telephone systems comprising a two wire circuit having a local termination for each said system, direct current isolation condensers in each said local termination, a battery feed relay in the local end of each said termination responsive to local seizure of said tie line and a tie line battery feed relay in the tie line end of each said termination normally unresponsive to a ground to ground and battery to battery connection between said two tie line battery feed relays and responsive to an odd number of reversals of the said tie line therebetween, each said local end battery feed relay having means to reverse the connections between said two tie line battery feed relays, and calling and busy signaling means controlled jointly by said two battery feed relays in each said local terminations.

16. In a key telephone system, a station line circuit accessible to subscribers of said system extending over a conventional two wire circuit to a distant conventional two wire circuit to a distant conventional telephone subscriber station, a source of ringing current, a ringing relay for applying said ringing current to said line circuit, a calling bridge relay responsive to the seizure of said line circuit by any one of said key telephone subscribers having access thereto and means controlled by said calling bridge relay for momentarily operating said ringing relay.

17. In a key telephone system, a station line circuit accessible to subscribers of said system extending over a conventional two wire circuit to a distant conventional telephone subscriber station, a source of ringing current, a ringing relay for applying said ringing current to said line circuit, a calling bridge relay responsive to the seizure of said line circuit by any one of said key telephone subscribers having access thereto, means controlled by said calling bridge relay for momentarily operating said ringing relay and means for prolonging the said momentary period of operation of said ringing relay.

No references cited.